(12) United States Patent
Janssen et al.

(10) Patent No.: US 6,982,108 B2
(45) Date of Patent: *Jan. 3, 2006

(54) COLOR-MATCHING ARTICLE

(75) Inventors: Jeffrey R. Janssen, Woodbury, MN (US); Michael J. Moszer, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 512 days.

This patent is subject to a terminal disclaimer.

(21) Appl. No.: 10/263,119

(22) Filed: Oct. 2, 2002

(65) Prior Publication Data

US 2004/0067350 A1 Apr. 8, 2004

(51) Int. Cl.
 - B32B 33/00 (2006.01)
 - B32B 7/12 (2006.01)
 - B65D 73/00 (2006.01)

(52) U.S. Cl. ............ 428/42.1; 428/202; 428/207; 428/354; 206/81

(58) Field of Classification Search .......... 428/195.1, 428/202, 207, 40.1, 41.6, 42.1, 343, 354; 206/81

See application file for complete search history.

(56) References Cited

U.S. PATENT DOCUMENTS

| | | |
|---|---|---|
| 4,104,809 A | 8/1978 | Day et al. |
| 4,379,696 A | 4/1983 | Lerner |
| 4,403,866 A | 9/1983 | Falcoff et al. |
| 4,457,718 A | 7/1984 | Lerner |
| 4,523,852 A | 6/1985 | Bauer |
| 4,636,805 A | 1/1987 | Toganoh et al. |
| 4,692,481 A | 9/1987 | Kelly |
| 4,795,254 A | 1/1989 | Kravetz |
| 4,887,217 A | 12/1989 | Sherman et al. |
| 4,917,745 A | 4/1990 | Speer |
| 5,120,601 A | 6/1992 | Kotaki et al. |
| 5,217,377 A | 6/1993 | Little, Jr. |
| 5,217,744 A | 6/1993 | Little, Jr. |
| 5,254,192 A | 10/1993 | Speakman |
| 5,342,688 A | 8/1994 | Kitchin et al. |
| 5,371,599 A | 12/1994 | Falcoff et al. |
| 5,567,507 A | 10/1996 | Paff et al. |
| 5,700,515 A | 12/1997 | Rodrigues |
| 5,743,407 A | 4/1998 | Williams |
| 5,851,583 A | 12/1998 | Kronenwetter |
| 6,217,934 B1 | 4/2001 | Eilenberger |
| 6,399,193 B1 | 6/2002 | Ellison |
| 6,440,551 B1 * | 8/2002 | Enniss et al. ............... 428/323 |

FOREIGN PATENT DOCUMENTS

| | | |
|---|---|---|
| DE | 9114530 | 2/1992 |
| EP | 0 178 096 B2 | 10/1993 |
| EP | 0 697 101 B1 | 7/1997 |
| EP | 0 949 120 A1 | 10/1999 |
| EP | 1 139 234 A1 | 10/2001 |
| GB | 425 246 | 11/1935 |
| GB | 2 058 387 A | 4/1981 |

(Continued)

OTHER PUBLICATIONS

*Handbook of Pressure Sensitive Adhesive Technology*, 2nd Edition, 1989, Van Nostrand Reinhold, pp. 585-626 (ISBN 0-442-28026-2).

(Continued)

*Primary Examiner*—Rena Dye
*Assistant Examiner*—Timothy M. Speer
(74) *Attorney, Agent, or Firm*—Pamela L. Stewart

(57) ABSTRACT

The present invention relates to color-matching articles used to color-match paint formulations to target substrates.

24 Claims, 8 Drawing Sheets

FOREIGN PATENT DOCUMENTS

| | | |
|---|---|---|
| GB | 2 222 478 | 3/1990 |
| GB | 2330795 | 5/1999 |
| JP | 60 105928 | 6/1985 |
| JP | 03-33135 A | 2/1991 |
| JP | 07-166095 | 6/1995 |
| JP | 07-166096 | 6/1995 |
| JP | 8-313350 | 11/1996 |
| JP | 9-249000 | 9/1997 |
| JP | 11-12553 | 1/1999 |
| WO | WO 88/06532 A1 | 9/1988 |
| WO | WO 93/13160 A1 | 7/1993 |
| WO | WO 00/08426 | 2/2000 |
| WO | WO 00/24575 A1 | 5/2000 |
| WO | WO 00/69985 A1 | 11/2000 |

OTHER PUBLICATIONS

*A Guide to Understanding Color Communication*, X-Rite Corp., 2000.

ASTM D1003-77.

* cited by examiner

COLOR-MATCHING ARTICLE

FIELD

The present invention relates to color-matching articles used to color-match paint formulations to target substrates.

BACKGROUND

Color-matching paint is an important step in the automobile repair process. It is also one of the most variable steps in the repair process. Typically, automobiles are assigned a paint color code by the manufacturer. This paint color code is often used by the paint formulator to generate an initial or starting point paint formulation. Starting point paint formulations can also be identified using spectrophotometric or "paint variance" techniques.

The "paint variance" method of matching paints is based on the measurement of color variability on actual vehicles. Vehicle colors can vary within an assembly plant or from plant to plant due to different paint chemistries. Some paint manufacturers survey vehicles from the different assembly plants and, based on the surveys, measure the variability of the color. Using this information, the paint manufacturer determines the variances in their formulation in order to best match the paint of a specific vehicle. A formulation deck contains the primary formula and variance formulations applied on a card. The formulation decks are typically updated about every six months and distributed to the painters under a fee-based service contract.

Often times, however, the formulation that the painter mixes based on the formulation deck recommendation does not provide an acceptable match. At this point, the painter needs to rely on his skills to match the vehicle paint by color-matching the paint formulation. Some paint manufacturers provide crude tinting guides, but these guides require the painter to apply complex color science information and relate it to a specific batch of paint using an abstract thought process. These additional steps are time consuming and may still result in a batch of paint having to be discarded or the vehicle having to be repainted.

A software-based system for color-matching relates a particular paint formulation to the VIN or vehicle identification number. While this system may minimizes some problems associated with manufacturing variability, it does not compensate for the natural aging of the paint on the vehicle or for mixing variation that may occur when the painter prepares only a small quantity of paint. The system does not provide guidance in color-matching a paint formulation once it has been mixed.

A spectrophotometric-based technique employs a software program in conjunction with a spectrophotometer. While such process will approximately match the hue of a painted substrate, they have difficulty accommodating the metallic or pearlescent appearance of some automotive paints. Goniophotometers or multi-angle spectrophotometers improve color matching results but are sophisticated and expensive pieces of equipment not ideally suited for collision repair facilities.

An additional aspect of color-matching is simulating the clearcoat that is very often applied over the base or color coat on modern vehicle paints. One method involves spraying the paint formulation onto one surface of a high gloss polyester film. The paint is then viewed through the polyester film with the film acting to simulate a clear coating. Although this method is effective for clearcoat simulation, it does not offer the painter guidance on adjusting the color of the paint in order to more accurately match the color of the target substrate.

In view of the foregoing, a need exists for an inexpensive, easy-to-use article to guide the painter in color-matching of a paint formulation to a target substrate, for example, a vehicle under repair.

SUMMARY

The present invention provides color-matching articles that are useful as guides in color-matching paint formulations to target substrates. The color-matching article of the present invention are particularly useful in guiding a painter in color-matching a paint formulation to the color of an automobile that is to be painted, for example, during an automobile body repair.

In one embodiment, a color-matching article of the present invention comprises a color-matching film comprising a base film (having a first major surface and a second major surface) and a colored layer applied to one major surface of the base film. The colored layer includes a plurality of transparent colored regions, for example, 2 to 100 colored regions or, more typically, 10 to 30 colored regions. The color-matching article may also include at least one transparent uncolored region for directly viewing the color of the paint formulation applied to the color-matching article. The transparent colored regions are selected to provide guidance to the painter in color matching. In at least one embodiment, the colored regions are each, preferably, of a different color. Using Commission Internationale de l'Eclairage (CIE) 1976 (L* a* b*) color scale, the colored regions may have a $\Delta E_{ab}^*$ value of about 0.2 or greater relative to one another.

In at least one embodiment, the colored layer is adhered to the second major surface of the base film and the color-matching article further includes an adhesive layer applied over the colored layer. The adhesive layer is useful for bonding the color-matching article to a spray-out card, which provides a substrate for application of the paint formulation to be color-matched. The adhesive layer is preferably a pressure sensitive adhesive which may be directly coated onto the color-matching article, or the adhesive may be provided in the form of an adhesive transfer tape for application to the color-matching article by the painter.

In some embodiments, the color-matching article includes a low-adhesion backsize layer adhered to the transparent base film opposite the adhesive layer. The color-matching article including a pressure sensitive adhesive and a low-adhesion backsize may be conveniently supplied in the form of a roll.

In some embodiments, the color-matching article includes a protective overlay sheet that is releasably attached to the transparent base film. The protective overlay sheet protects the transparent base film from paint overspray (e.g., during application of paint to the color-matching article), scratching and/or other damage that may occur to the transparent base film. The protective overlay sheet is removed prior to comparing the color-matching article to the target substrate.

Color-matching articles of the present invention include an index that associates at least one of the transparent colored regions with at least one mixing base color. As used herein the term "mixing base" or "mixing base color" refers to a standard paint formulation provided by a manufacturer of a brand of paint for use in mixing and color matching of paint formulations. The mixing bases are combined at specific ratios to duplicate the color of the paint. For example, PPG Industries (Strongville, Ohio) manufactures automobile paints under the trade designation "DELTRON 2000". This brand of automobile paints includes a variety of mixing bases identified as "DMD XXX" or DMDXXX, where XX or XXX represents a two or three digit numeric code, respectively, identifying the specific mixing base. Examples of other automobile paint manufacturers include BASF, Kansai, Nippon, and DuPont.

In one embodiment, the index comprises a listing of at least one mixing base color printed inside or proximate at least one of the transparent colored regions. In another embodiment, the index comprises a unique symbol identifying each of the plurality of colored regions (e.g., printed inside or proximate each of the colored regions) and a document listing at least one mixing base color for each symbol. In yet another embodiment, the index comprises a document comprising a pictorial representation of the arrangement of the colored regions on the color-matching film and a listing of at least one mixing base code corresponding to each colored region.

In another aspect the present invention provides a kit for color-matching a paint formulation to a target substrate comprising:
 (i) a color-matching article comprising:
  (a) a color-matching film comprising:
   a transparent base film having a first major surface and a second major surface; and
   a colored layer adhered to at least one major surface of the base film, the colored layer including a plurality of transparent colored regions; and
  (b) an index that associates at least one of the colored regions with at least one mixing base color;
 (ii) a layer of pressure sensitive adhesive; and
 (iii) a spray-out card.

Optionally, the kit for color-matching may further include a laminator for laminating the color-matching article to the spray-out card.

Color-matching articles of the present invention may be used in a method of color-matching comprising the steps of:
 (a) providing a color-matching article;
 (b) applying a paint formulation over at least a portion of the colored layer to form a paint layer on the color-matching article;
 (c) comparing the color-matching article to the target substrate by viewing the paint layer through the transparent base film and colored regions; and
 (d) selecting the colored region that most closely matches the color of the target substrate.

In another embodiment, the method comprises the steps of:
 (a) providing a color-matching article;
 (b) providing a spray-out card having a paintable surface;
 (c) applying a paint formulation over the paintable surface of the spray-out card to form a paint layer;
 (d) adhering the color-matching article to the paint layer on the spray-out card with an adhesive;
 (e) comparing the color-matching article formed in step (d) to the target substrate by viewing the paint layer through the transparent base film and colored regions; and
 (f) selecting the colored region that most closely matches the color of the target substrate.

Step (d) may comprise the steps of:
 (d1) providing an adhesive transfer tape having a first and second major surface;
 (d2) adhering one major surface of the adhesive transfer tape to the paint layer on the spray-out card; and
 (d3) adhering one major surface of the adhesive transfer tape to the colored layer of the color-matching article.

Step (d) may be conducted, for example, using a portable lamination device.

BRIEF DESCRIPTION OF THE DRAWINGS

FIG. 1b is a top view of the embodiment of a color-matching article of the present invention shown in FIG. 1a.

FIG. 1a' is a cross-sectional view of an embodiment of a color-matching article of the present invention having a protective overlay sheet attached.

FIG. 3b is a top view of the embodiment of color-matching article of the present invention shown in FIG. 3a.

FIG. 10b is a cross-sectional view of the color-matching article of FIG. 10a.

DETAILED DESCRIPTION

The present invention describes color-matching articles and methods of using described color-matching articles for the color-matching of paint formulations to target substrates.

Figure 1A:
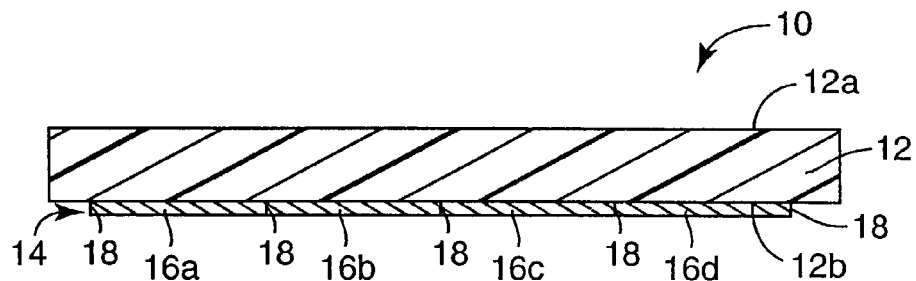
FIG. 1a is a cross-sectional view of an embodiment of a color-matching article of the present invention.

Referring to FIG. 1a there is shown a side view of an embodiment of a color-matching article of the present invention. Color-matching article 10 includes base film 12 having first major surface 12a and second major surface 12b. Second major surface 12b is preferably ink-receptive. Adhered to at least a portion of second major surface 12b is colored layer 14.

Figure 1B:
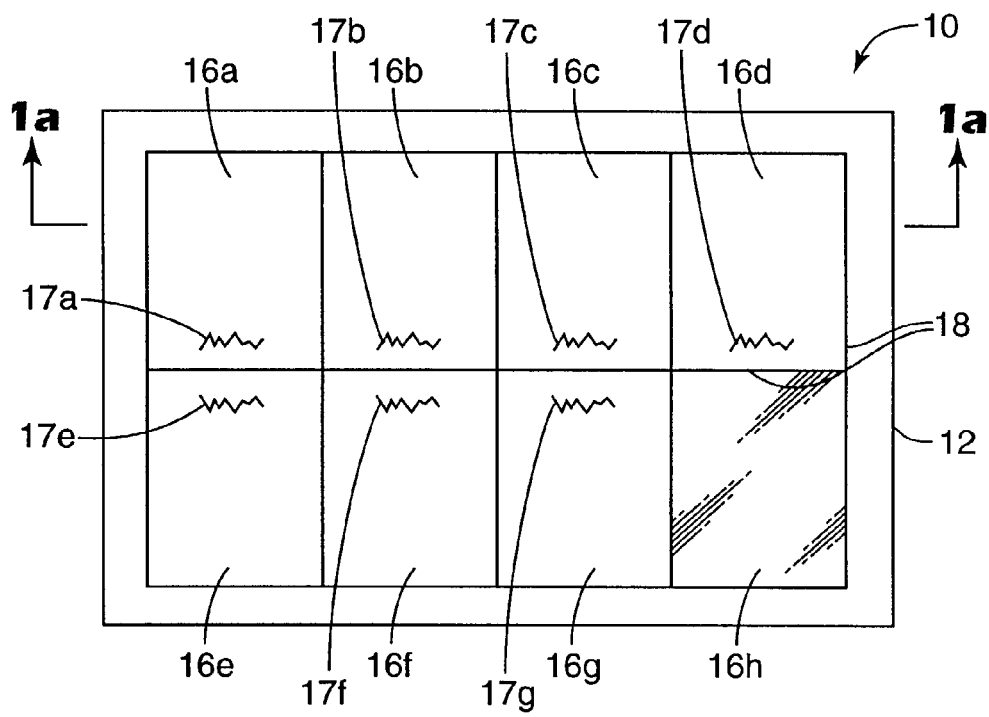
Figure 1A:
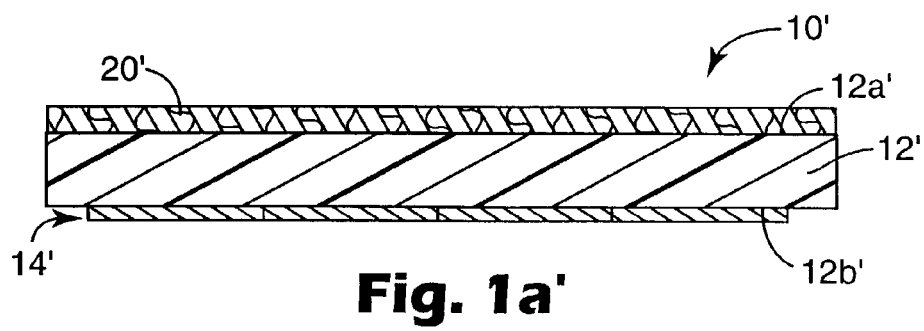

Referring now to FIG. 1b, a top view of color-matching article 10 of FIG. 1a is shown. As shown in FIG. 1b, colored layer 14 includes a plurality of colored regions identified as 16a, 16b, 16c, 16d, 16e, 16f, and 16g. The plurality of colored regions are selected to provide guidance to the painter in the process of color-matching. Preferably, colored regions 16a–16g of printed layer 14 each comprise a different color. In one embodiment, the colored regions may display the various colors of a color wheel, for example, blue, violet, red, orange, yellow, lime, green, and aqua or a subset thereof. Typically, relative to one another, the colors are selected to have a $\Delta E_{ab}^*$ of 0.2 or greater. In one embodiment, at least one region 16h is unprinted so that the color of paint applied to the color-matching article can be observed directly through base film 12. In the embodiment shown in FIG. 1b, the color-matching article 10 includes optional demarcation lines 18 printed between the various regions 16a–16h. The demarcation lines 18 identify the borders between adjacent regions 16a–16h.

As shown in FIG. 1a', color-matching articles of the present invention may optionally comprise a protective overlay sheet 20 that is releasably attached to the first major surface 12a' of base film 12'. The protective overlay sheet 20 acts to protect the base film layer 12' from being scratched and/or from the deposition of paint overspray, for example, during application of paint to the second major surface 12b' of the color-matching article 12'.

Figure 2A:
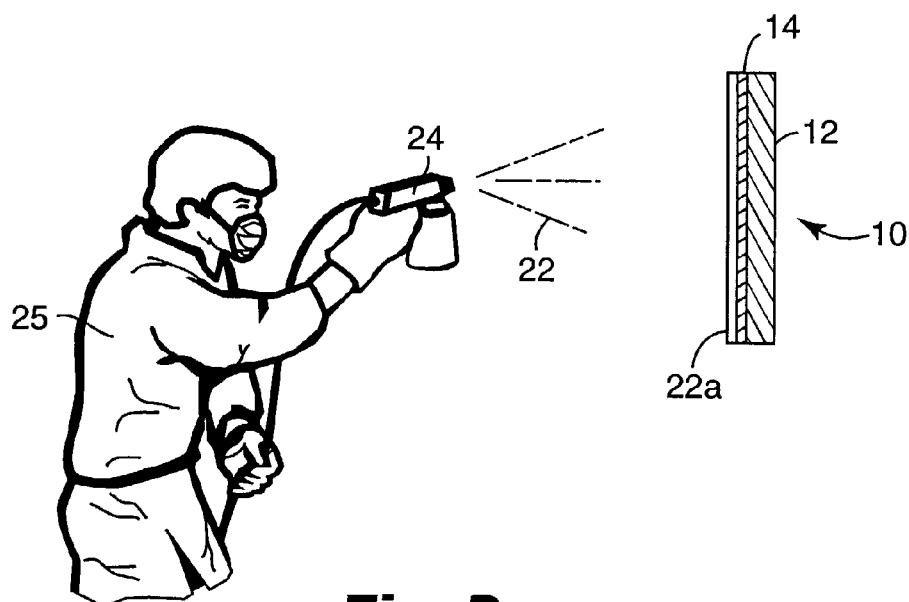
FIG. 2a is a perspective view showing application of paint by a painter to a color-matching article of the present invention.
Figure 2B:
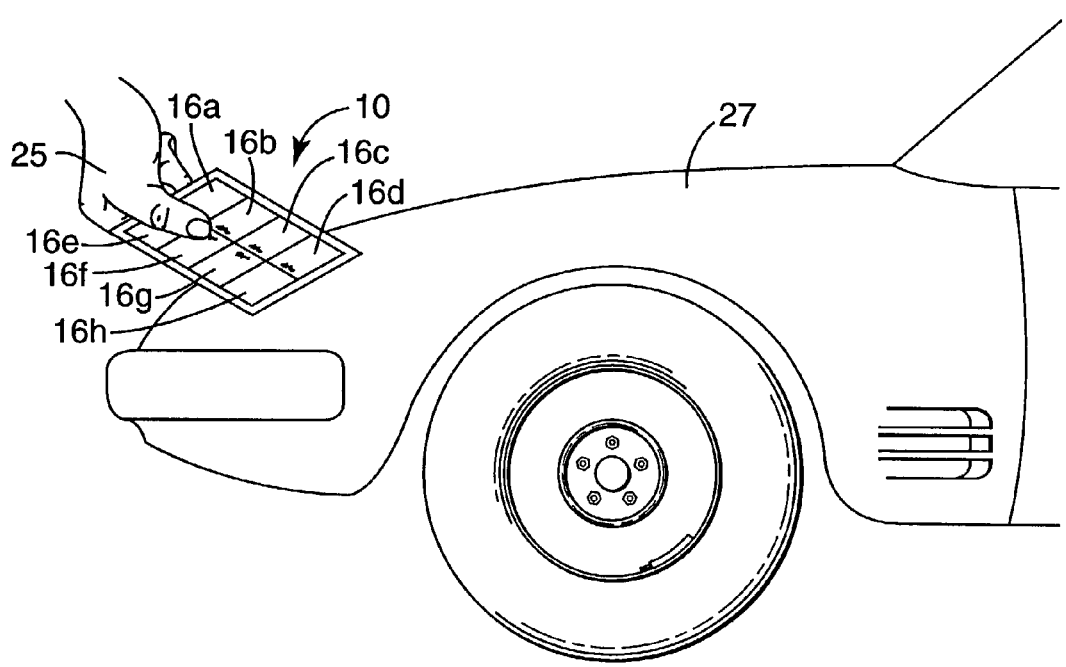
FIG. 2b is a perspective view showing a painter visually comparing a painted color-matching article of the present invention to a target substrate.

The color-matching article shown in FIGS. 1a–b is used in a method of color matching according to the present invention. In the method, a paint formulation to be color-matched to a target substrate is first applied directly over at least a portion of colored layer 14 of the color-matching article 10. Preferably, the paint formulation is applied over all of the colored regions 16a–16g and, if present, the uncolored region 16h. The paint formulation may be initially formulated, for example, with reference to paint codes that are provided with the automobile or with reference to color chips that are provided by various paint suppliers. FIG. 2a shows application of paint formulation 22 over colored layer 14 of color-matching article 10 by painter 25 using pressurized spray gun 24 to form paint layer 22a. Preferably, paint layer 22a is then allowed to dry. It is to be understood that paint may be applied to the color-matching article using any known technique. After paint layer 22a has dried, the painted color-matching article 10 is then visually compared to the target substrate. If the color-matching article includes a protective overlay sheet 20 (see FIG. 1a') then the protective overlay sheet is removed prior to visually comparing the color-matching article to a the target substrate. FIG. 2b shows painter 25 visually comparing painted color-matching article 10 to target substrate 27, which in this embodiment of the method is the painted surface of an automobile. At this point, the painter 25 then selects the colored region 16a–16g of the color-matching article displaying an observed color that most closely matches the color of the target substrate 27. The observed colors displayed on the color-matching article result from the colored regions 16a–16g being overlaid onto paint layer 22a. In order to make this selection, it may be desirable to view the painted color-matching article 10 and target substrate 27 under more than one lighting condition, for example, artificial light and sunlight.

After selecting the colored region 16a–16g displaying an observed color that most closely matches the target substrate, the painter 25 then refers to the index of the color-matching article 10. The index functions to associate the colored regions 16a–16g with at least one mixing base color. In the embodiment of FIG. 1b, the index is integral with the paint-matching article 10 and comprises a listing of the mixing base color codes 17a–17g for each colored region 16a–16g, respectively, printed on base film 12 proximate the appropriate colored region 16a–16g. For example, a colored region having a blue hue includes an index listing one or more mixing base color codes for blue mixing bases. Other embodiments of the index are within the scope of this invention and additional examples are described herein.

After referring to the index, the painter 25 then adds to the initially formulated paint an aliquot of the mixing base referred to in the index. The addition of an aliquot of mixing base to the initial paint formulation results in a color-matched paint formulation that preferably more closely matches the color of the target substrate 27. If the resulting paint formulation is not color-matched to an acceptable level, it may be desirable to repeat the method described above in order to provide an improved color-matched paint formulation. Although broadly suitable for color-matching, the article and method shown and described above are preferred for the color-matching non-metallic paints.

Figure 3A:
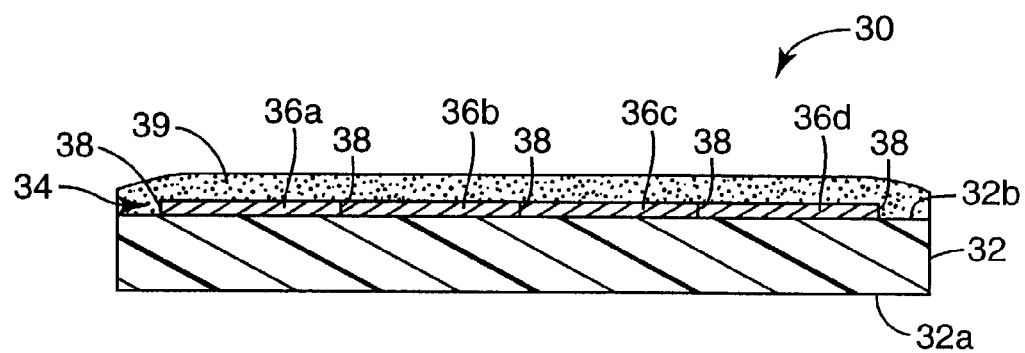
FIG. 3a is a cross-sectional view of the embodiment of a color-matching article of the present invention.
Figure 3B:
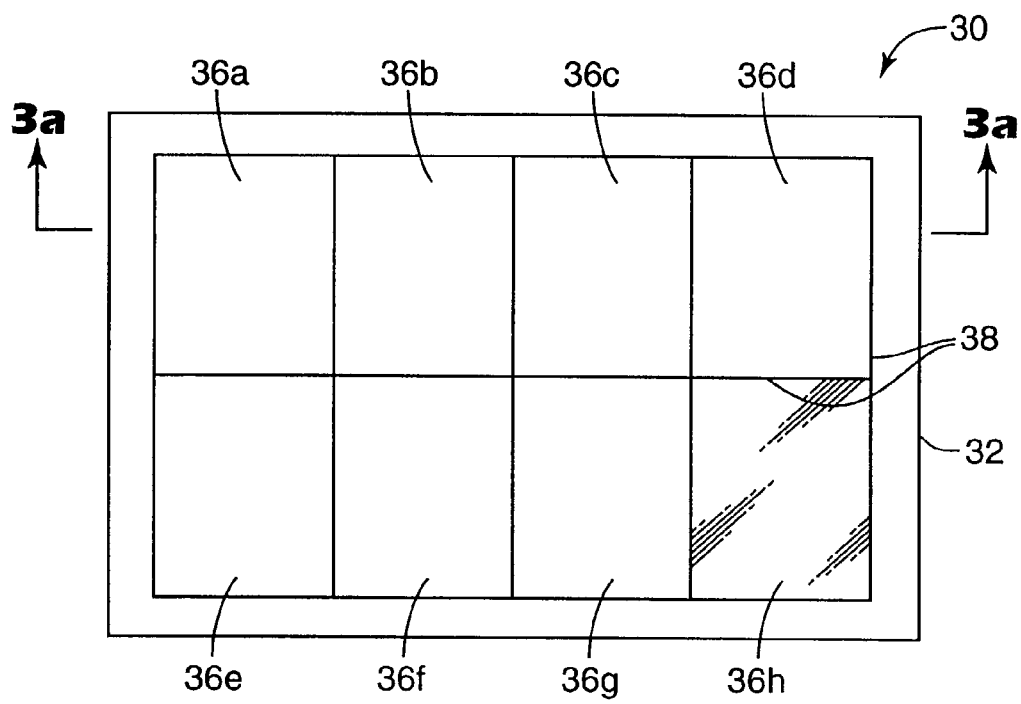

Referring now to FIG. 3a, another embodiment of a color-matching article according to the present invention is shown. Color-matching article 30 includes base film 32 having first major surface 32a and second major surface 32b. Second major surface 32b is preferably ink-receptive. Adhered to at least a portion of second major surface 32b is colored layer 34. Adhesive layer 39 is adhered directly over at least a portion of colored layer 34. Adhesive layer 39 may be pre-applied to the color-matching article or the adhesive layer may be provided with the color-matching article in the form of an adhesive transfer tape to be applied to the color-matching article by the painter. Examples of suitable adhesive transfer tapes include those available under the trade designations "9667MP" and "9471FL" (from 3M Company, St. Paul, Minn.). Preferably, adhesive layer 39 is coextensive with the colored layer 34. Adhesive layer 39 functions to adhesively bond color-matching article 30 to a painted spray-out card as will be described below. Referring now to FIG. 3b, a top view of color-matching article 30 of FIG. 3a is shown. As shown in FIG. 3b, colored layer 34 includes a plurality of colored regions identified as 36a, 36b, 36c, 36d, 36e, 36f, and 36g. The plurality of colored regions 36a–36g are selected to provide guidance to the painter in the process of color-matching. Preferably, colored regions 36a–36g of printed layer 34 each comprise a different color. In one embodiment, the colored regions may display the various colors of a color wheel, for example, blue, violet, red, orange, yellow, lime, green, and aqua or a subset thereof. Typically, relative to one another, the colors are selected to have a $\Delta E_{ab}^*$ of 0.2 or greater. In one embodiment, at least one region 36h is unprinted so that the color of paint applied to the color-matching article can be observed directly through the base film 32. In the embodiment shown in FIG. 3b, the color-matching article 30 includes optional demarcation lines 38 printed between the various colored regions 36a–36g of the colored layer 34.

Color matching article 30 may be used in a method of color-matching according to the present invention. In this method, the color-matching article of FIG. 3a is adhesively bonded to a spray-out card, which serves to provide a uniform surface for applying the paint formulation that is to be color-matched to the target substrate.

Figure 4:
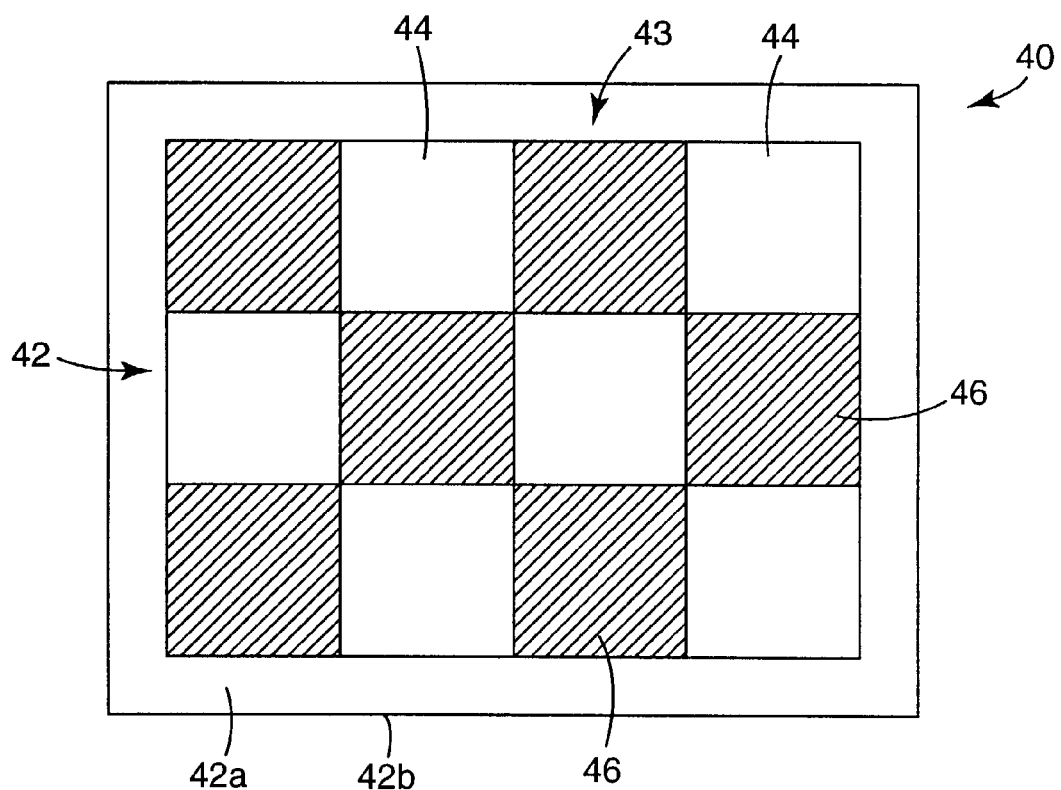
FIG. 4 is a top view of an embodiment of a spray out card.

Referring to FIG. 4, an embodiment of a spray-out card 40 is shown. Spray-out card 40 includes backing 42 having first major surface 42a and second major surface 42b. First major surface 42a is provided with a checkerboard-type pattern 43 of alternating white squares 44 and black squares 46. The checkerboard pattern provides guidance to the painter in determining the thickness of paint coating that is required for effective coverage of a surface. That is, paint is applied to the surface of the spray-out card 40 until the checkerboard-type pattern 43 is no longer visible. It is understood that the spray-out card may display any suitable contrasting colors and/or contrasting pattern and may in some instance display a pattern-free, single color surface, for example, a white surface.

Figure 5:
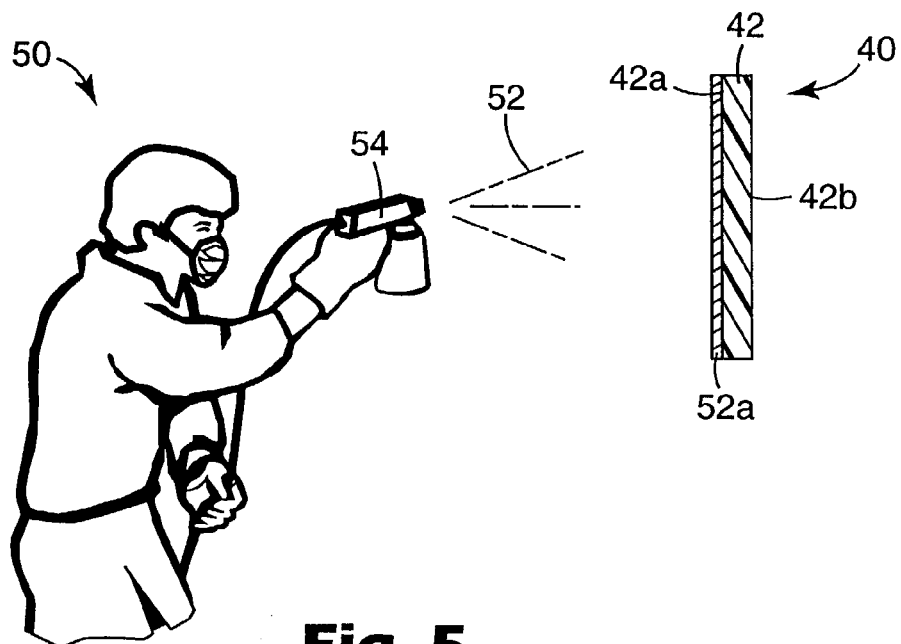
FIG. 5 is a perspective view showing a painter applying a paint formulation to the spray out card of FIG. 4.
Figure 6:
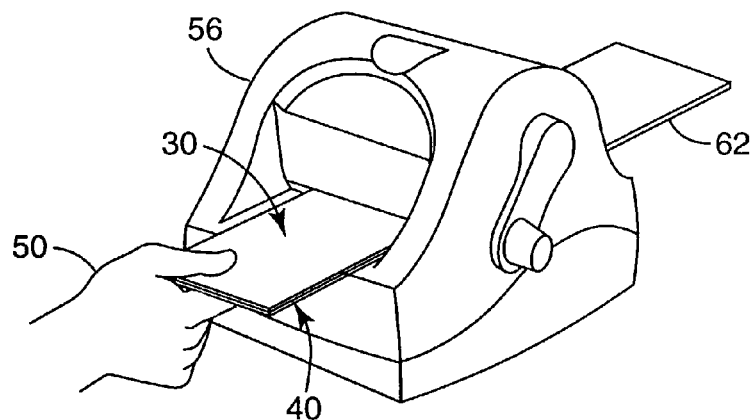
FIG. 6 is a perspective view of a painter adhesively bonding a color-matching article of the present invention to a painted spray-out card.
Figure 7:
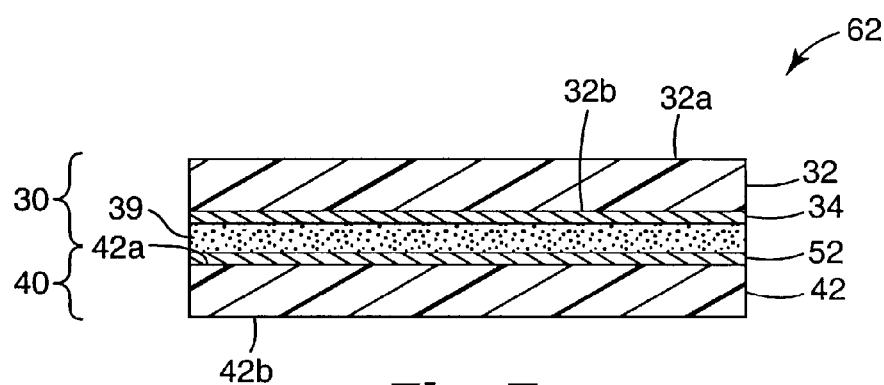
FIG. 7 is a cross-sectional view of a color-matching article of the present invention adhesively bonded to a painted spray out card.

In this method, a paint formulation is first prepared, preferably so that it closely approximates the color of the target substrate to be painted. The paint is first formulated, for example, with reference to paint codes that are provided with the automobile or with reference to color chips that are provided by various paint suppliers for the purpose of color-matching. FIG. 5 shows painter 50 applying the initial paint formulation 52 with a pressurized spray gun 54 to the first major surface 42a of spray-out card 40 to form paint layer 52a. Preferably, paint layer 52a is then allowed to dry. After paint layer 52a has dried, color-matching article 30 is adhesively bonded to the painted layer 52a of the spray-out card 40 using adhesive layer 39. The adhesive layer 39 may be pre-applied to the color-matching article (see, FIG. 3a) or the adhesive may be provided separately, for example, in the form of an adhesive transfer tape. Examples of adhesive transfer tapes include those available under the trade designations "9667MP" and "9471FL" (from 3M Company, St. Paul, Minn.). Preferably, the color-matching article 30 is adhesively bonded to the painted layer 52a without forming bubbles, wrinkles, or other defects that may deleteriously affect viewing of the painted layer 52a through the color-matching article 30. Adhesive bonding of the color-matching article 30 to the painted layer 52a on the spray-out card 40 may be assisted, for example, by use of a hand-held roller, squeegee, or a portable lamination device, for example, the portable lamination device available under the trade designation "XYRON 510" (Part Number XRN510ATPS) from Xyron, Inc. (Scottsdale, Ariz.). FIG. 6 shows painter 50 adhesively bonding color-matching article 30 to the paint layer 52a on spray-out card 40 using portable lamination device 56 to form laminated color matching article 62 having the structure as shown in FIG. 7.

Figure 8:
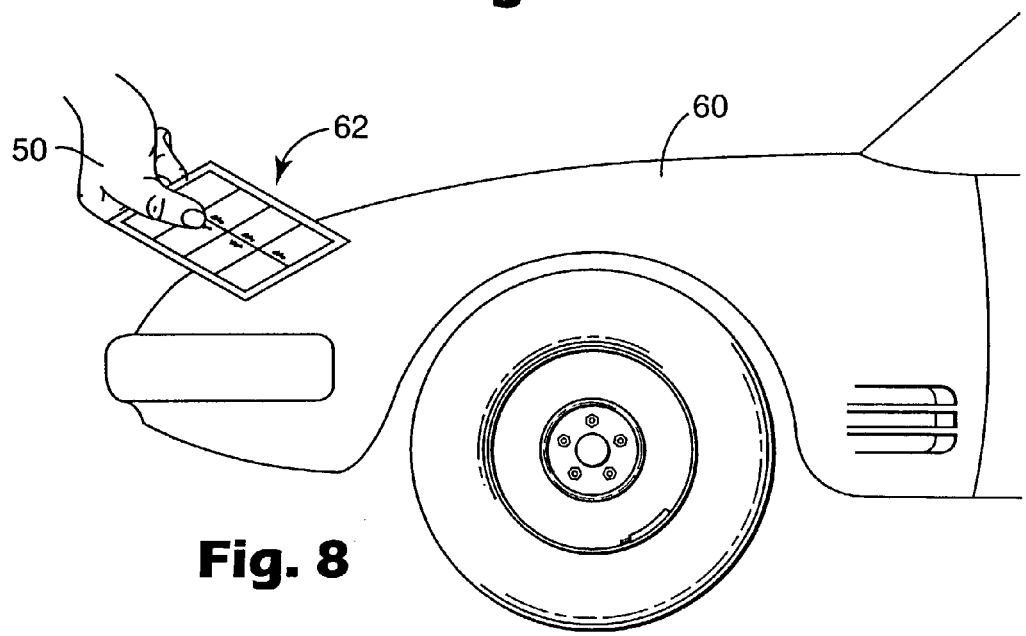
FIG. 8 is a perspective view showing a painter visually comparing a color matching article of the present invention to a target substrate.

Once the color-matching article 30 has been adhesively bonded to the paint layer 52a, the paint layer 52a can be viewed through the first major surface 32a of laminated color-matching article 62. When viewed through the first major surface 32a, the color of paint layer 52a is modified by the colored regions 36a–36g so that the color-matching article 62 displays observed colors resulting from the combination of colored regions 36a–36g with painted layer 52a. The painter then compares the observed colors with the color of the target substrate in order to determine which observed color most closely matches the color of the target substrate. FIG. 8 shows painter 50 comparing color-matching article 62 with target substrate 60. The painter may also view the unaltered color of the paint layer 52a directly through region 36h, in order to determine if the initial paint formulation is the closest match for the target substrate 60. Typically, the color-matching article 62 is placed in close proximity to the target substrate 60 and is viewed at various angles and under various lighting conditions. After comparing the color-matching article 62 to the target substrate, the painter 50 selects the region 36a–36h displaying an observed color that most closely matches the color of the target substrate 60. If the region selected is one of the colored regions 36a–36g, then the painter refers to the index provided with the color-matching article in order to select the mixing base that should be added to the paint formulation. The function of the index is to provide guidance to the painter in selecting the mixing base(s) that should be added to the paint formulation in order to color match the paint formulation to the target substrate.

Although broadly suitable for color-matching, the above-described article and method are particularly useful for color-matching metallic and pearlescent paints as well as also being suited for conventional (i.e., non-metallic, non-pearlescent) paints.

Figure 9:
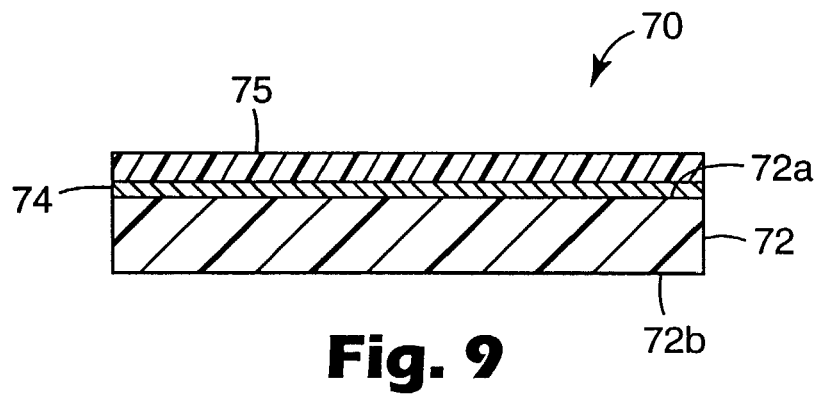
FIG. 9 is a cross-sectional view of an embodiment of a color-matching article of the present invention.

Referring now to FIG. 9, another embodiment of a color-matching article of the present invention is shown. Color-matching article 70 comprises a base film 72 having first major surface 72a and second major surface 72b. Adhered to first major surface 72a is colored layer 74. Colored layer 74 includes a plurality of colored regions as shown and described above. Adhered to colored layer 74 is transparent top layer 75. Transparent top layer 75 may comprise, for example, a polymer film adhesively bonded to the colored layer 74 or a polymer coating. Optionally, a protective overlay sheet may be applied over transparent top layer 75. The transparent top layer 75 is preferably selected to simulate the appearance of an automotive clearcoat layer, that is, a smooth (or slightly textured) high gloss coating. Examples of polymer coatings include cured or lacquer systems such as acrylics, epoxies, olefins, urethanes, and the like. Cured coatings may be cured, for example, via chemical reaction stimulated by heat, light, or a catalyst. The coating can be applied by conventional coating techniques, for example, printing and spraying. Examples of adhesively bonded polymer films include achromic polyester films and the like. The color-matching article 70 may be directly painted over second major surface 72b or, alternatively, the second major surface 72b of color-matching article 70 may be coated with an adhesive layer and laminated to a painted spray-out card as shown and described.

Figure 10A:
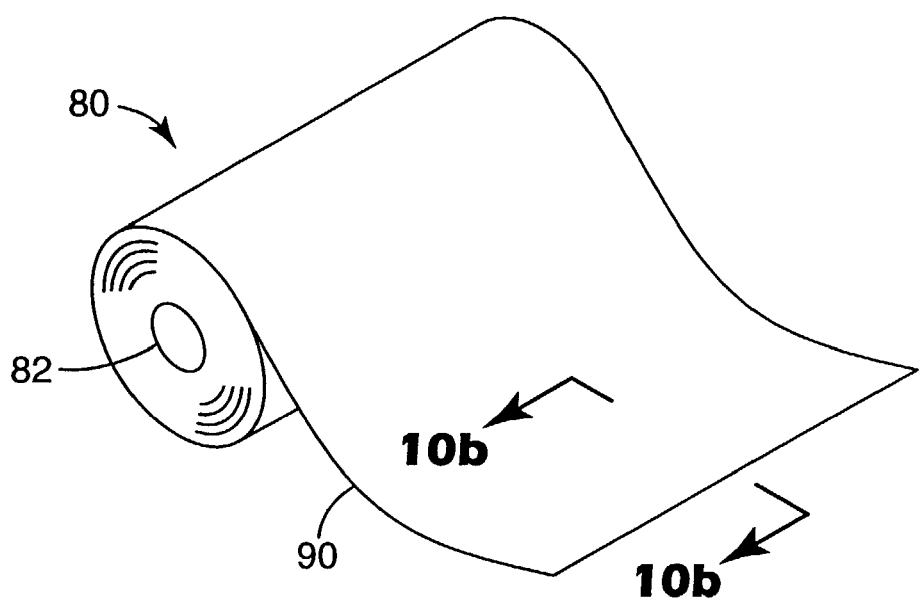
FIG. 10a shows a perspective view of a color-matching article of the present invention supplied in roll form.
Figure 10B:
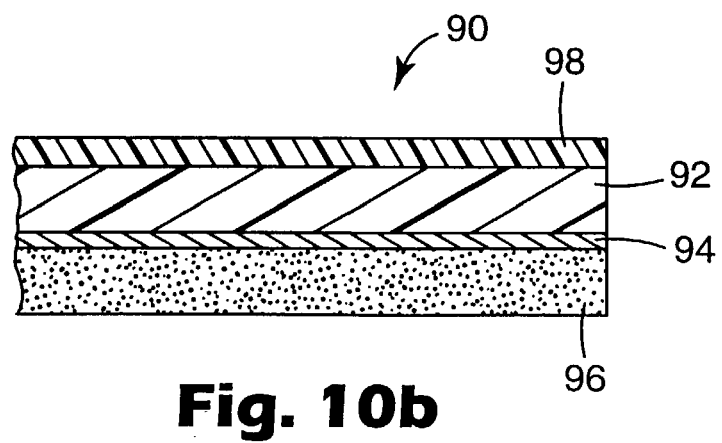

In the embodiments of color-matching articles of the present invention having a pre-applied adhesive, the color-matching article may be conveniently supplied in roll form similar to that of adhesive tape, for example, a masking tape. FIG. 10a shows a perspective view of a color-matching article of the present invention supplied in roll form. Roll 80 includes core 82 around which is wound a length of color-matching article 90. As shown in FIG. 10b, color-matching article 90 includes base film layer 92, colored layer 94, adhesive layer 96, and optional low adhesion backsize layer 98. Colored layer 94 includes a plurality of colored regions as shown and described above (not shown). Low adhesion backsize layer 98 allows adhesive layer 96 to release from base film layer 92 when a length of color-matching article 90 is unwound from roll 80. Suitable materials for forming low adhesion backsize layer 98 are known in the art and are selected among other considerations with reference to the type of pressure sensitive adhesive chosen for adhesive layer 96. Low-adhesion backsize materials include, for example, silicones, long chain branched polymers (e.g., copolymers of alkyl acrylate and acrylic acid, stearyl methacrylate-acrylonitrile copolymer), polyvinyl carbamates (e.g., polyvinyl N-octadecyl carbamate), fluorocarbon polymers, and amines. Preferably, the release layer should be achromic so that it does not impart color to the color-matching article. Examples of low adhesion backsize materials are reported, for example, in Chapters 23–24 of Satas, *Handbook of Pressure Sensitive Adhesive Technology*, $2^{nd}$ Edition, 1989, Van Nostrand Reinhold (ISBN 0-442-28026-2).

Color-matching article of the present invention preferably include an index that functions to associate the colored regions of the printed layer with at least one mixing base color. In one embodiment, as shown in FIGS. 1a–b, the index comprises a listing of mixing base(s) printed directly onto or adhered directly to the color-matching article at a location inside (or proximate to) the colored region(s) of the color-matching article. That is, for each colored region of the color-matching article, the code(s) of the mixing base(s) are listed inside or proximate to the appropriate colored region. Mixing base codes for more than one paint supplier may be listed in each colored region in order that color-matching article is suitable for use with paint from more than one supplier.

Figure 11A:
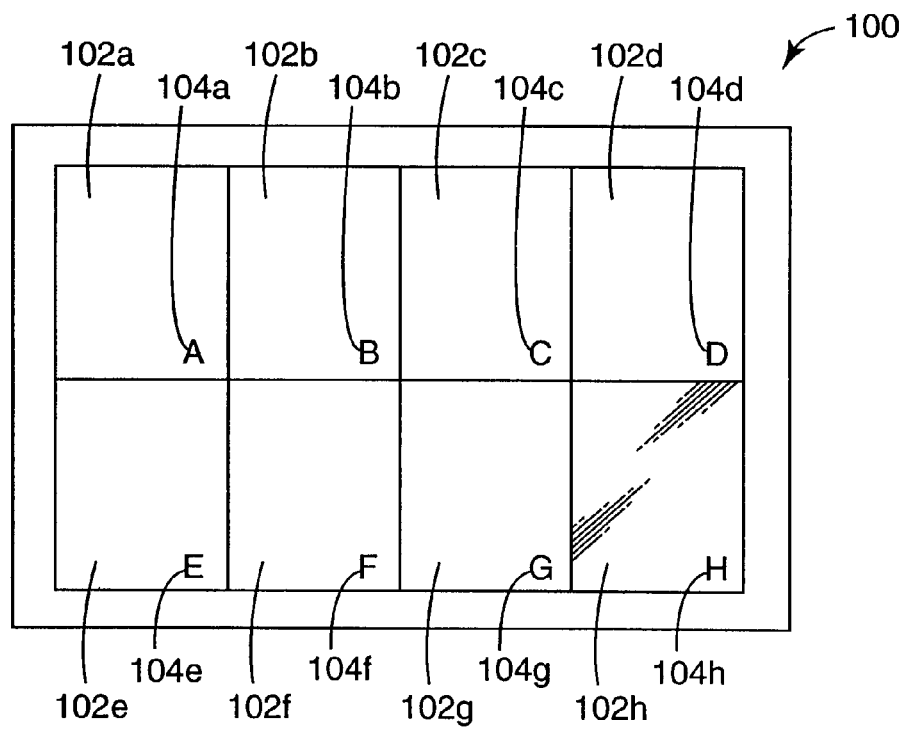
FIGS. 11a–11b show a top view of a color-matching article of the present invention detailing an embodiment of an index.
Figure 11B:
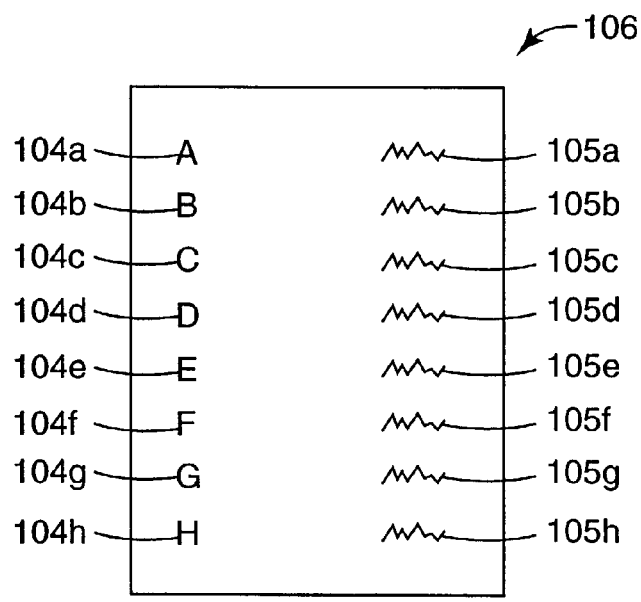

In another embodiment, the index comprises a listing of the mixing base(s) provided separate from the color-matching article itself and a legend that matches the mixing base(s) with the appropriate colored region of the color-matching article. For example, as shown in FIG. 11a, a top view of color-matching article 100 is shown. Color-matching article 100 includes colored regions 102a–102g and transparent region 102h. Each of the regions 102a–102g is identified with a symbol 104a–104g, for example, a letter or number, printed on the color-matching article proximate the colored region. Preferably, region 102h is also identified with a symbol 104h. For example, as shown in FIG. 11a the regions 102a–120h are identified with the letters A-H. A separate list 106 shown in FIG. 11b identifies the regions 102a–102h by the symbols 104a–104h printed on the color-matching article 100 and lists the mixing base(s) 105a–105g that corresponds to the colored regions 102a–102g. List 106 also preferably identifies at 105h that region 102h is an uncolored region. The index embodiment of FIGS. 11a–11b is advantageous because the color-matching article can be paired with multiple lists 106 wherein each list identifies the mixing base code(s) for a different paint manufacturer. For example, color-matching articles may be manufactured with the colored regions identified by letters (e.g., A through G). Multiple lists may be printed with each list associating the letters (A through G) with mixing base code(s) from a different paint manufacturer. In this way, a single color-matching article may be used with multiple brands of paint.

Figure 12A:
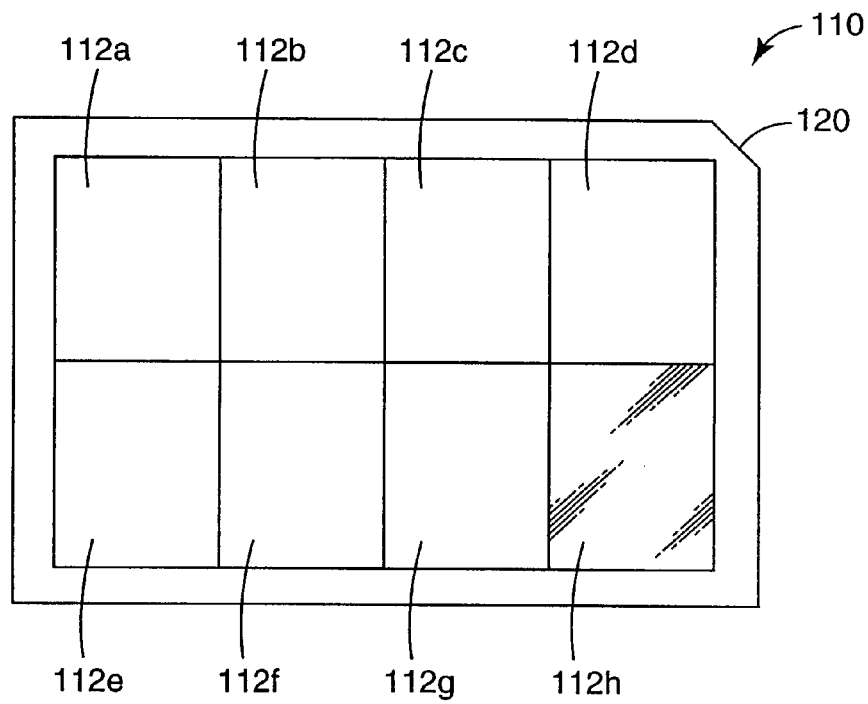
FIGS. 12a–12b show a top view of a color-matching article of the present invention detailing an embodiment of an index.
Figure 12B:
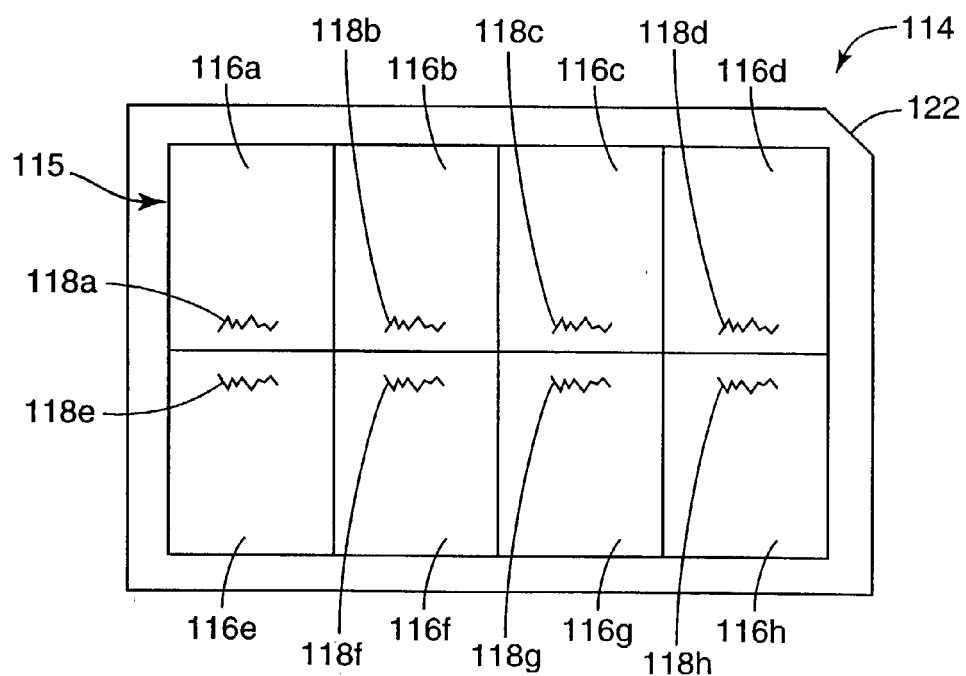

Yet another embodiment of an index is shown in FIGS. 12a–12b. As shown in FIG. 12a, color matching article 110 includes colored regions 112a–112g and uncolored region 112h. Document 114 shown in FIG. 12b displays a pictorial representation 115, which includes regions 116a–116g, which represent colored regions 112a–112g of the color-matching article 110, respectively. Printed within each region 116a–116g on document 114 are the mixing base code(s) 118a–118g that correspond to the colored regions 112a–112g of the color-matching article 110. Document 114 identifies at 118h that region 112h of color-matching article 110 is an uncolored region. Orientation of the pictorial representation 115 of FIG. 12b relative to the color matching article 110 may be provided, for example, by providing a clipped corner 120 on color matching article 110 and a similarly positioned clipped corner 122 on document 114. For example, as shown in FIGS. 12a–12b, the upper right hand corners of color-matching article 110 and document 114 may be clipped. It is understood that other embodiments of the index may also be envisioned and the invention is not to be limited by the specific form and/or content of the index.

Components making-up the color-matching article are further described below.

The base film layer of the color-matching article typically comprises a transparent polymer film. Typically, the base film layer comprises a polymer, for example, polyester, polycarbonate, acrylic, polyurethane, polyolefin, ethylene vinyl acetate, biaxially oriented polypropylene, polyvinyl chloride, polystyrene, urethane acrylate, epoxy, epoxy acrylate, and blends thereof. A preferred base film layer comprises polyester.

Preferred base film layers are transparent and achromic (i.e., colorless). Preferably, the base film layer has a percent haze that is less than about 5%, more preferably less than about 1.5%, and most preferably less than about 0.5% when tested in accordance with ASTM D1003-77. Preferably, the base film layer is achromic, having $\Delta a^*$ and $\Delta b^*$ values measured using the Commission Internationale de l'Eclairage (CIE) 1976 ($L^*$ $a^*$ $b^*$) color scale (i.e., CIELAB scale) that are less than about 1.0 and 1.0, respectively, more preferably less than about 0.25 and 0.25, respectively. Values of $\Delta a^*$ and $\Delta b^*$ may be measured, for example, using a Model 530 spectrophotometer (D65 illuminant and a 10 degree observer angle, available from X-Rite, Inc., Grandville, Mich.) in reflectance mode with the color-matching article placed over the white reference tile supplied with the spectrophotometer.

The base film layer typically has a thickness ranging from about 0.5 to 10.0 mils (12 $\mu$m to 250 $\mu$m), preferably ranging from about 1.0 to 5.0 mils (25 $\mu$m to 125 $\mu$m), and more preferably ranging from about 1.5 to 2.5 mils (37 $\mu$m to 62 $\mu$m).

The base film may further comprise an ink receptive layer. The composition of the ink receptive layer may vary according to the printing process employed in the present invention, for example, inkjet, electrophotographic, flexographic, laser imaging techniques. Examples of ink receptive compositions include gelatins, polyvinyl alcohols, starches, cellulose derivatives, polyvinylpyrrolidone, polyethyleneimine, polyvinylpyridinum halide, sodium polyacrylate, polyvinylformal, PMMA, polyvinylbutyral, polyacrylonitrile, polyvinylchloride, polyvinylacetate, phenolic resins as described in U.S. Pat. No. 4,636,805 (Toganoh et al.). The ink receptive composition may optionally further comprise additives to enhance performance, such as polymeric mordants to reduce bleeding as described in U.S. Pat. No. 5,342,688 (Kitchen et al.), resin particles to increase water absorption as described in U.S. Pat. No. 5,120,601 (Asahi), surfactants to promote leveling and adhesion to the surface of the ink receptive layer as described in PCT Publication No. WO 88/06532 (Kruse). Ink receptive compositions may also comprise multiple dissimilar polymeric layers to reduce ink migration, drying time and mud-cracking as described in U.S. Pat. No. 5,567,507 (Paff et al.).

An adhesion promoting priming layer may also be interposed between the ink receptive layer and the base film. Such priming layers can include prime coatings, such as polyvinylidene chloride, and optionally a gelatin sublayer between the film and the prime layer may be applied, commercially available as "SCOTCHPAR TYPE PH" primed and subbed film, from 3M Co., St. Paul, Minn. Alternatively, surface treatments, such as corona treatment, or other appropriate treatment can be used to promote adhesion. Such treatments would be known to one of ordinary skill in the art.

The film optionally further comprises treatments or compositions to control the physical properties of the sheet such as surface roughness, static charge accumulation, and curl-set. Backside coatings, opposite the ink receptive coating, may provide surface roughness to assist sheet feeding through the transport rollers of an inkjet printer. Application of antistatic coatings and related treatments curtail the accumulation of static charge that may cause feeding and stacking problems between sheets. Hydrophilic, moisture absorbing coatings applied on the backside of the film counteract image-side curl. The backside coating may itself be an inkjet receptive layer, such that the construction is symmetrical having no preferred orientation during deposition of an inkjet image.

Examples of films suitable for use as the base film layer include those available under the designations "HOSTAPHAN 4 LAM" and "HOSTAPHAN 4TLO" (available from Mitsubishi Polyester Films, Greer, S.C.); "QUESTAR AL-101" and "QUESTAR AG-104" (available from Filmquest Inc., St. Charles, Ill.); Experimental Product # 150-4-9 (from Felix Schoeller Technical Papers, Inc., Pulaski N.Y.) and "3M GC3480 INKJET TRANSPARENCY FILM" (from 3M Company, St. Paul, Minn.).

The colored layer includes at least one colored region and applied to a major surface of the base film layer. Preferably, the colored layer includes more than one, more preferably two or more (i.e., a plurality) colored regions. For example, the printed layer may include 2 to 100 colored regions, more typically 10 to 30 colored regions, and most typically 15 to 40 colored regions. The colored regions will typically each be a different color. As used herein the term "color" refers to a stimulus based on visual response to light consisting of three dimensions hue, chroma, and value. As used herein the term "hue" refers to the attribute of color by means of which a color is perceived to be red, yellow, green, blue, purple, etc. The five principal hues are red, yellow, green, blue, and purple. The five intermediate hues are yellow-red, green-yellow, blue-green, purple-blue and red-purple. As used herein the term "chroma" refers to the intensity or saturation level of a particular hue, defined as the distance of departure of a chromatic color from the neutral (i.e., gray) color. As used herein the term "value" refers to the degree of lightness or darkness of a color in relation to a neutral gray scale. Color and color differences may be measured, for example, using the CIE (Commission Internationale de l'Eclairage) color spaces including, for example, CIE XYZ, CIE L*a*b*, and CIE L*C*h° (see, *A Guide to Understanding Color Communication,* X-Rite Corp., 2000).

The colors provided in the colored regions of the color-matching article of the present invention are selected to provide guidance to the painter in matching various paint formulations to the color of a target substrate, such as an automobile. Preferably, the colored regions on a color-matching article will vary in hue, intensity and/or saturation from one another. In one preferred embodiment, the colored regions vary in hue in an arrangement following that of a color wheel (i.e., blue, violet, red, orange, yellow, lime, green, and aqua). Preferably, each of the colored regions is a unique color, that is, each colored region is different in hue and/or intensity and/or saturation from the other colored regions on the color-matching article. In some embodiments, any two of the colored regions have a $\Delta E_{ab}*$ of 0.2 or greater with respect to each other.

The colored regions can be of any desired size and/or shape and/or arrangement. Typically, the colored regions are square or rectangular in shape and have an area of about 0.5 to 4 square inches (3.12 cm² to 25 cm²), more preferably about 1 to 3 square inches (6.25 cm² to 18.75 cm²). In one embodiment, the colored regions are rectangular having one side length equal to 24.5 mm a second side length equal to 14.5 mm. The colored regions may be arranged in any desired arrangement. In one embodiment, the colored regions are rectangular and are arranged in column and row fashion.

The colored layer may be applied to the base film by any known method for forming an image on the base film, including, for example, screen printing, electrographic (electrostatic and electrophotographic) printing, offset printing, flexographic printing, gravure printing, inkjet (thermal and piezoelectric) printing, or thermal mass transfer printing. The printed layer can be generated using a spot color that has been prematched to a target color using analog printing approaches such as screen printing, flexographic printing, offset and gravure printing. Preferred printing processes include 4 or 6 color ink jet printing, electrostatic or electrophotographic printing.

Suitable inkjet printers include piezoelectric inkjet printers available under the trade designation "5000 SERIES" from Raster Graphics, San Jose, Calif., as well as printers available from Gerber, Inc., Burlington, Mass., and Xerox Corporation, Stamford, Conn. Suitable thermal inkjet printers include those available under the trade designation "DESKJET", for example, "DESKJET 950C" printers available from Hewlett-Packard Co., Palo Alto, Calif.

Suitable electrostatic printers include single-pass printers and multiple pass printers. Single Pass Printers include the machines available under the trade designations "SCOTCHPRINT MODEL 9512" and "SCOTCHPRINT MODEL 2000" electrostatic printers from 3M, St. Paul, Minn. Suitable multiple-pass electrostatic printers include those available under the trade designation "MODEL 8900 SERIES" printers from Xerox Corporation, Rochester, N.Y., and those available under the trade designation "MODEL 5400 SERIES" from Raster Graphics.

Suitable electrophotographic printers include those available under the trade designation "INDIGO SERIES" liquid electrophotographic printers from Hewlett-Packard Co.

When present, the adhesive layer functions to adhesively-bond the color-matching article to the painted spray-out card. Preferably, the adhesive is achromic (i.e., colorless) and transparent so that it does not alter the color and/or appearance of the paint that is viewed through the color-matching article.

In one embodiment, the adhesive layer has a percent haze that is less than about 5%, more preferably less than about 1.5%, and most preferably less than about 0.5% when tested in accordance with ASTM D1003-77. Preferably, the adhesive layer is achromic having $\Delta a*$ and $\Delta b*$ values measured using the Commission Internationale de l'Eclairage (CIE) 1976 (L* a* b*) color scale (i.e., CIELAB scale) that are less than about 1.0 and 1.0, respectively, more preferably less than about 0.25 and 0.25, respectively. Values of $\Delta a*$ and $\Delta b*$ may be measured, for example, using a Model 530 spectrophotometer (D65 illuminant and 10 degree standard observer angle, from X-Rite, Inc., Grandville, Mich.) in reflectance mode with the color-matching article placed over a white reference tile supplied with the instrument.

The adhesive layer may comprise any type of adhesive but is most typically a pressure sensitive adhesive. Suitable pressure sensitive adhesives include, for example, acrylics (e.g., solvent cast, water based latex or 100% solids systems that are thermally cured, UV cured, or e-beam cured acyrlics), rubbers (e.g., thermoplastic, block copolymers, natural rubber or silicone rubber), polyolefins (ethylene vinyl acetate polymers, poly-alpha olefins ($C_3$–$C_{10}$) copolymers, or blends/mixtures thereof.

Stress relaxation is a property that is indicative of the viscoelastic flow of an adhesive. Adhesives with little or no flow properties relax less than about 15% of the applied stress. Preferably, the adhesive has a stress relaxation value that ranges from about 15% to about 100%, more preferably ranging from about 15% to about 60% when measured at about 23° C. and about 50% relative humidity according to the following equation:

Percent Stress Relaxation=(initial load−load after 120 sec)×100/initial load.

Procedures for measuring stress relaxation of adhesive are reported in WO 00/24575.

Generally, it is desirable for the adhesive to have a smooth bonding surface. A smooth bonding surface may be provided, for example, by using a smooth paper release liner or a polymer film-based release liner, for example, a silicone coated polyester release liner. An example of a polymer film based release liners includes "100 GA POLY C/W WITH SR" (available from CP Films, Inc, Martinsville, Va.).

Optionally, the adhesive may be provided with a microstructured bonding surface designed to aid in the formation of wrinkle-free and bubble-free laminates with the spray-out card. Textured adhesives are reported, for example, in PCT Publication No. WO 00/69985 (Mikami et al.), the disclosure of which is incorporated herein by reference. Preferably, the adhesive should flow-out so that the texture is coalesced. When adhesively bonded, the color-matching article should approximate the texture of an automotive clearcoat with some amount of "orange-peel" texture being tolerable.

Typically, the adhesive layer has a thickness ranging from about 5 μm to about 150 μm, more preferably ranging from about 10 μm to about 50 μm, and most preferably ranging from about 25 μm to about 50 μm. The thickness of the adhesive is selected to provide adequate adhesion of the color-matching article to the spray-out card.

The adhesive layer may be pre-applied to the second major surface of the color-matching article or the adhesive may be supplied to the painter in the form of an adhesive transfer tape (i.e., a layer of adhesive supplied on a release liner) for application by the painter. Examples of adhesive transfer tapes include the transfer tape commercially available under the trade designation "8142" (from 3M Company, St. Paul, Minn.).

In some embodiments, the color-matching article of the present invention includes a protective overlay sheet over the first major surface of the base film to protect the base film from paint overspray and/or damage, for example, during lamination of the color-matching article to the spray-out card. The protective overlay sheet may comprise paper or polymer film and typically includes a coating of a low-tack pressure sensitive adhesive applied over at least a portion of one major surface. The low-tack adhesive releasably attaches the protective overlay sheet to the base film layer. Examples of materials that may be suitable as protective overlay sheets include the products known under the trade designations "2070 SAFE-RELEASE", "2090 LONG MASK" and "3M WELDING AND SPARK DEFLECTION PAPER" (all materials commercially available from 3M Company, St. Paul, Minn.). It is understood that other means of releasably attaching the protective overlay sheet to the color-matching article may also be employed, for example, mechanical attachment devices such as paper clips and the like.

EXAMPLES

Comparative Example A

A premixed non-metallic base coat paint, "OPAL WHITE BASECOAT", Toyota color code 046 Chromabase L9339K, obtained from GT Parts Company, St. Paul Minn., was sprayed onto a 5×8 inch (12.8×20.3 cm) 300-micron thick smooth paint test panel card using a low pressure high volume gravity fed spray gun. The spray gun was "SATA-JET B NR 95", available from SATA Farbspritztechnik GmbH & Co., Komwestheim, Germany, with a line pressure of 10 psi (68.7 kPa) and an orifice size of 1.3 mm. The paint test panel card, comprising a 1-inch square (6.25 cm$^2$) black and white checkerboard pattern, was supplied DuPont Performance Coatings, Wilmington, Del., part number E82800-02 M-57 Rev. 1/2001. The paint was allowed to dry at room temperature, approximately 21° C., for one minute. The process was repeated an additional two times in order to hide the checkerboard pattern, after which the paint test panel was allowed to dry for 30 minutes.

A clearcoat was prepared by manually mixing in a plastic cup with a metal spatula, the following components obtained from DuPont Performance Coatings:

| Component | Dupont Part Number | Parts by Volume |
|---|---|---|
| Hardener | 7875 S | 1 |
| Clear Base | 7800 S | 4 |

Using the same spray gun and pressure described above and 10 psi (68.7 pKa) pressure at the tip of the nozzle, the clear coat was sprayed over the dried non-metallic base coat and allowed to air dry at approximately 70° F. (21.1° C.), for 5 minutes. A second layer of the clearcoat was sprayed onto the sample and it was dried at 70° F. (21.1° C.) for 6 hours until it was tack free.

The CIE 1976 L*a*b* values of the finished coating were measured using a "MODEL 530" spectrophotometer, available from X-Rite Corporation, Grandville Mich., with a 6 mm aperture, under D65 illumination and 10 degree viewing angle. The L*, a* and b* values were recorded in Tables 5–7.

Comparative Example B

Comparative Sample B was prepared, and CIE 1976 L*a*b* values measured, as described in Comparative Sample A, except that "CASHMERE BEIGE METALLIC", color code 4M9—Chromabase N9924K (available from GT Parts Company, St. Paul Minn.) was substituted for the non-metallic base coat.

Example 1

A color array as shown in FIGS. 1a and 1b was generated as a software file using "MICROSOFT POWERPOINT 2000" program, available from Microsoft Corp., Redmond, Wash. The array consisted of 14 rows of sequentially numbered rectangles, in two adjacent columns, labeled "A" and "B", having dimensions of 14 mm by 24.5 mm. The rectangles were separated by gray dotted lines. With the exception of the first row, all of the rectangles were filled with a color using the PowerPoint 2000 software. Rows 2–13 varied in hue, while column "A" differed from column "B" in color intensity. Table 1 lists the RGB settings for each rectangle as described by the "Custom Fill" Section in the PowerPoint 2000 software.

TABLE 1

| Row | Column | Red | Green | Blue | DELTRON 2000 Mixing Base Designation |
|---|---|---|---|---|---|
| 1 | A | 0 | 0 | 0 | None |
| 1 | B | 0 | 0 | 0 | None |
| 2 | A | 252 | 252 | 252 | DMD 648 |

TABLE 1-continued

| Row | Column | Red | Green | Blue | DELTRON 2000 Mixing Base Designation |
|---|---|---|---|---|---|
| 2 | B | 246 | 250 | 250 | DMD 648 |
| 3 | A | 251 | 255 | 252 | DMD 1678 |
| 3 | B | 241 | 255 | 244 | DMD 1678 |
| 4 | A | 251 | 255 | 254 | DMD 1676, DMD 615 |
| 4 | B | 243 | 255 | 252 | DMD 1676, DMD 615 |
| 5 | A | 251 | 254 | 255 | DMD 614, DMD 613, DMD 1675 |
| 5 | B | 243 | 252 | 249 | DMD 614, DMD 613, DMD 1675 |
| 6 | A | 251 | 252 | 255 | DMD 624 |
| 6 | B | 241 | 244 | 255 | DMD 624 |
| 7 | A | 252 | 251 | 255 | DMD 1679 |
| 7 | B | 246 | 243 | 255 | DMD 1679 |
| 8 | A | 254 | 251 | 255 | DMD 626 |
| 8 | B | 252 | 243 | 255 | DMD 626 |
| 9 | A | 255 | 249 | 252 | DMD 669, DMD 662 |
| 9 | B | 255 | 241 | 249 | DMD 669, DMD 662 |
| 10 | A | 255 | 249 | 250 | DMD 1677, DMD 1692, DMD 1694 |
| 10 | B | 255 | 241 | 244 | DMD 1677, DMD 1692, DMD 1694 |
| 11 | A | 255 | 250 | 249 | DMD 617, DMD 616, DMD 1608 |
| 11 | B | 255 | 242 | 241 | DMD 617, DMD 616, DMD 1608 |
| 12 | A | 2SS | 2S2 | 249 | DMD 618 |
| 12 | B | 255 | 248 | 241 | DMD 618 |
| 13 | A | 255 | 254 | 249 | DMD 623, DMD 671 |
| 13 | B | 2SS | 253 | 241 | DMD 623, DMD 671 |
| 14 | A | 254 | 255 | 249 | DMD 643, DMD 641 |
| 14 | B | 253 | 255 | 241 | DMD 643, DMD 641 |

The color array was printed onto the ink-receptive side of a 215 mm×279 mm sheet of 3.8 mil polyester film, commercially available as type "CG3480 INKJET TRANSPARENCY FILM", from 3M Co., St. Paul, Minn., using a model "DESKJET 950C" ink jet printer, from Hewlett-Packard Co., Palo Alto, Calif. The color array was allowed to dry for 5 minutes at room temperature, approximately 21° C. A 75 mm×280 mm optically clear transfer adhesive sheet having a 50 micron adhesive layer, commercially available as type "8142 TRANSFER ADHESIVE SHEET", from 3M Co., was laminated over the color array. Any air bubbles trapped between the transfer adhesive sheet and the color array were removed by manually using a yellow 15 cm wide squeegee with a "T" handle, available from Sun-X International Corp., Dallas, Tex.

The metallic base coat painted test panel was prepared as described in Comparative Sample B, except that no clear coat was applied. The release liner was removed from the adhesive coated color array. The color array was then laminated onto the metallic base coated paint test panel card. Any air bubbles trapped between the color array and the test panel card base coated were removed by manually squeegeeing as described above. The color-matching card had 26 color iterations for use as a color-matching article. The polyester film simulated a clearcoat appearance.

By comparing sections 1A and 1B with the surface to be matched, the painter can assess the color of the paint with a simulated clear coat applied over the surface. By examining sections 2A–14A the painter can then determine how best to adjust the hue of the paint system using very dilute color shifts. By examining sections 2B–14B the painter can then assess the hue of the paint using more saturated color shifts. If the color needs to be adjusted, the painter selects the column and row section that best matches the hue of the target substrate. This information can then be correlated to the hue of the mixing bases that the painter has at his disposal. The reference sheet (described below) indicates the hue of the individual mixing bases in comparison to the 14 major sections of the Color-matching Aide. The painter can identify the column and row of the color-matching aide that best matches the color of the target substrate.

CIE 1976 L*a*b* values of the color-matching card were measured according to the method described in Comparative Sample A. The difference from Comparative Example B is represented by ΔL*, Δa*, and Δb*. Results are listed in Table 2.

TABLE 2

| Row | Column | L* | a* | b* | ΔL* | Δa* | Δb* |
|---|---|---|---|---|---|---|---|
| 1 | A | 63.04 | 2.78 | 9.84 | −0.68 | −0.23 | −0.22 |
| 1 | B | 63.07 | 2.83 | 9.85 | −0.65 | −0.18 | −0.21 |
| 2 | A | 62.83 | 2.89 | 10.03 | −0.89 | −0.12 | −0.03 |
| 2 | B | 62.71 | 2.02 | 9.33 | −1.01 | −0.99 | −0.73 |
| 3 | A | 62.72 | 2.13 | 9.79 | −1.00 | −0.88 | −0.27 |
| 3 | B | 61.80 | −0.02 | 9.44 | −1.92 | −3.03 | −0.62 |
| 4 | A | 62.75 | 2.17 | 9.53 | −0.97 | −0.84 | −0.53 |
| 4 | B | 61.98 | 0.78 | 8.71 | −1.74 | −2.23 | −1.35 |
| 5 | A | 62.68 | 2.19 | 9.56 | −1.04 | −0.82 | −0.50 |
| 5 | B | 61.95 | 0.76 | 8.45 | −1.77 | −2.25 | −1.61 |
| 6 | A | 62.61 | 2.17 | 9.51 | −1.11 | −0.84 | −0.55 |
| 6 | B | 60.69 | 1.12 | 7.31 | −3.03 | −1.89 | −2.75 |
| 7 | A | 62.69 | 2.93 | 9.55 | −1.03 | −0.08 | −0.51 |
| 7 | B | 61.29 | 2.60 | 7.91 | −2.43 | −0.41 | −2.15 |
| 8 | A | 62.91 | 3.31 | 9.82 | −0.81 | 0.30 | −0.24 |
| 8 | B | 61.99 | 3.90 | 8.80 | −1.73 | 0.89 | −1.26 |
| 9 | A | 62.85 | 3.53 | 9.78 | −0.87 | 0.52 | −0.28 |
| 9 | B | 62.02 | 4.23 | 9.07 | −1.70 | 1.22 | −0.99 |
| 10 | A | 62.03 | 3.35 | 9.85 | −1.69 | 0.34 | −0.21 |
| 10 | B | 61.99 | 3.97 | 9.57 | −1.73 | 0.96 | −0.49 |
| 11 | A | 63.33 | 3.05 | 10.48 | −0.39 | 0.04 | 0.42 |
| 11 | B | 62.58 | 3.59 | 10.13 | −1.14 | 0.58 | 0.07 |
| 12 | A | 63.30 | 2.81 | 10.60 | −0.42 | −0.20 | 0.54 |
| 12 | B | 62.95 | 3.06 | 11.06 | −0.77 | 0.05 | 1.00 |
| 13 | A | 63.36 | 2.71 | 10.83 | −0.36 | −0.30 | 0.77 |
| 13 | B | 63.31 | 2.58 | 11.71 | −0.41 | −0.43 | 1.65 |
| 14 | A | 63.06 | 2.78 | 10.92 | −0.66 | −0.23 | 0.86 |
| 14 | B | 62.71 | 2.20 | 11.79 | −1.01 | −0.81 | 1.73 |
| Base Coat Only | | 67.35 | 3.21 | 10.25 | 3.61 | −0.20 | −0.19 |
| Comparative B | | 63.74 | 3.01 | 10.06 | 0 | 0 | 0 |

Example 2

A color-matching article was prepared as described in Example 1, except the smooth polyester liner of the transfer adhesive sheet was replaced with a microstructured silicone coated polyethylene laminated paper prepared as described in WO 00/69985 (Example 3) having inverted truncated pyramidal grooves. The grooves in the microstructured polyethylene layer had the following dimensions: depth=21 μm; pitch=198 μm; top width=67 μm; bottom width=3 μm; angle α1 degree=39.

Imparting a textured pattern into the adhesive layer eliminated air pockets between the color array and the adhesive transfer sheet during the lamination step.

TABLE 3

| Row | Column | L* | a* | b* | ΔL* | Δa* | Δb* |
|---|---|---|---|---|---|---|---|
| 1 | A | 63.34 | 2.78 | 9.84 | −0.38 | −0.23 | −0.22 |
| 1 | B | 63.54 | 2.75 | 9.81 | −0.18 | −0.26 | −0.25 |
| 2 | A | 63.33 | 2.72 | 9.74 | −0.39 | −0.29 | −0.32 |

TABLE 3-continued

| Row | Column | L* | a* | b* | ΔL* | Δa* | Δb* |
|---|---|---|---|---|---|---|---|
| 2 | B | 63.13 | 1.81 | 9.14 | −0.59 | −1.20 | −0.92 |
| 3 | A | 62.77 | 1.81 | 8.72 | −0.95 | −1.20 | −1.34 |
| 3 | B | 62.18 | −0.07 | 9.25 | −1.54 | −3.08 | −0.81 |
| 4 | A | 63.05 | 1.96 | 8.95 | −0.67 | −1.05 | −1.11 |
| 4 | B | 62.25 | 0.67 | 8.63 | −1.47 | −2.34 | −1.43 |
| 5 | A | 62.73 | 2.09 | 9.41 | −0.99 | −0.92 | −0.65 |
| 5 | B | 62.07 | 0.82 | 8.53 | −1.65 | −2.19 | −1.53 |
| 6 | A | 63.22 | 2.17 | 9.54 | −0.50 | −0.84 | −0.52 |
| 6 | B | 61.60 | 1.15 | 7.50 | −2.12 | −1.86 | −2.56 |
| 7 | A | 62.64 | 2.92 | 9.56 | −1.08 | −0.09 | −0.50 |
| 7 | B | 61.72 | 2.54 | 8.07 | −2.00 | −0.47 | −1.99 |
| 8 | A | 63.26 | 3.27 | 9.77 | −0.46 | 0.26 | −0.29 |
| 8 | B | 62.14 | 3.85 | 8.92 | −1.58 | 0.84 | −1.14 |
| 9 | A | 62.20 | 3.50 | 9.67 | −1.52 | 0.49 | −0.39 |
| 9 | B | 62.43 | 4.14 | 9.15 | −1.29 | 1.13 | −0.91 |
| 10 | A | 63.03 | 3.35 | 9.83 | −0.69 | 0.34 | −0.23 |
| 10 | B | 62.43 | 3.94 | 9.75 | −1.29 | 0.93 | −0.31 |
| 11 | A | 63.36 | 3.01 | 10.46 | −0.36 | 0.00 | 0.40 |
| 11 | B | 62.63 | 3.56 | 10.22 | −1.09 | 0.55 | 0.16 |
| 12 | A | 63.53 | 2.76 | 10.78 | −0.19 | −0.25 | 0.72 |
| 12 | B | 63.25 | 3.00 | 10.98 | −0.47 | −0.01 | 0.92 |
| 13 | A | 63.41 | 2.73 | 10.06 | −0.31 | −0.28 | 0.00 |
| 13 | B | 63.32 | 2.59 | 11.73 | −0.40 | −0.42 | 1.67 |
| 14 | A | 63.50 | 2.72 | 10.98 | −0.22 | −0.29 | 0.92 |
| 14 | B | 63.33 | 2.19 | 11.64 | −0.39 | −0.82 | 1.58 |
| Base Coat Only | | 67.35 | 3.21 | 10.25 | 3.61 | −0.20 | −0.19 |
| Comparative B | | 63.74 | 3.01 | 10.06 | 0 | 0 | 0 |

Example 3

The PowerPoint software file described in Example 1 was translated into a "QUARKXPRESS 4.0" file, available from Quark Inc., Denver, Colo. The same RGB values as listed in Table 1 were used to fill the sections in the Quark file.

An acrylic primer layer, available under the trade designation "TOPAZ", available from Hewlett Packard Co., Palo Alto, Calif., was applied to a roll of 50 micron polyester film on a 12 inch (30.5 cm) wide model "MARK ANDY" flexographic printing press, available from Mark Andy, Inc., St. Louis, Mo. The primer layer was applied using a 300-line "ANILOX" roll to an "EPDM" transfer roll. The coating was transferred to the web at 100 ft./min (30.5 m/min) and dried on the press.

Using the QuarkXpress file, a color array described in Example 1 was printed on the primed surface of the polyester roll using an "OMNIUS" electrophotographic printer available and "ELECTROINK" toners, available from Hewlett Packard Co. The color array was then used to prepare a color-matching card as described in Example 1 by laminating to "8142 TRANSFER ADHESIVE SHEET" (available from 3M Co.) CIE 1976 L*a*b* and ΔL*, Δa*, and Δb* values are listed in Table 4.

TABLE 4

| Row | Column | L* | a* | b* | ΔL* | Δa* | Δb* |
|---|---|---|---|---|---|---|---|
| 1 | A | 64.04 | 2.42 | 8.96 | 0.32 | −0.59 | −1.10 |
| 1 | B | 63.77 | 2.50 | 9.03 | 0.05 | −0.51 | −1.03 |
| 2 | A | 63.50 | 2.72 | 9.37 | −0.74 | −1.33 | −2.32 |
| 2 | B | 62.98 | 1.68 | 7.74 | −0.22 | −0.29 | −0.69 |
| 3 | A | 63.86 | 2.42 | 8.89 | 0.14 | −0.59 | −1.17 |
| 3 | B | 62.04 | −0.51 | 7.55 | −1.68 | −3.52 | −2.51 |
| 4 | A | 63.65 | 2.19 | 8.80 | −0.07 | −0.82 | −1.26 |

TABLE 4-continued

| Row | Column | L* | a* | b* | ΔL* | Δa* | Δb* |
|---|---|---|---|---|---|---|---|
| 4 | B | 63.69 | 0.94 | 7.15 | −0.03 | −2.07 | −2.91 |
| 5 | A | 63.70 | 2.28 | 9.00 | −0.02 | −0.73 | −1.06 |
| 5 | B | 62.52 | 1.23 | 7.83 | −1.20 | −1.78 | −2.23 |
| 6 | A | 63.49 | 2.76 | 9.26 | −0.23 | −0.25 | −0.80 |
| 6 | B | 62.45 | 2.09 | 7.64 | −1.27 | −0.92 | −2.42 |
| 7 | A | 63.67 | 2.80 | 9.36 | −0.05 | −0.21 | −0.70 |
| 7 | B | 62.27 | 2.41 | 7.89 | −1.45 | −0.60 | −2.17 |
| 8 | A | 63.55 | 2.77 | 9.24 | −0.17 | −0.24 | −0.82 |
| 8 | B | 62.44 | 2.93 | 8.45 | −1.28 | −0.08 | −1.61 |
| 9 | A | 63.40 | 2.61 | 9.01 | −0.32 | −0.40 | −1.05 |
| 9 | B | 62.57 | 3.11 | 8.68 | −1.15 | 0.10 | −1.38 |
| 10 | A | 63.07 | 2.69 | 9.34 | −0.65 | −0.32 | −0.72 |
| 10 | B | 62.19 | 3.16 | 8.64 | −1.53 | 0.15 | −1.42 |
| 11 | A | 63.39 | 2.39 | 9.32 | −0.33 | −0.62 | −0.74 |
| 11 | B | 62.11 | 2.98 | 9.83 | −1.61 | −0.03 | −0.23 |
| 12 | A | 63.41 | 2.75 | 10.14 | −0.31 | −0.26 | 0.08 |
| 12 | B | 63.05 | 2.59 | 10.94 | −0.67 | −0.42 | 0.88 |
| 13 | A | 63.72 | 2.46 | 10.09 | 0.00 | −0.55 | 0.03 |
| 13 | B | 62.99 | 2.08 | 11.56 | −0.73 | −0.93 | 1.50 |
| 14 | A | 64.03 | 2.53 | 10.11 | 0.31 | −0.48 | 0.05 |
| 14 | B | 63.34 | 1.82 | 11.22 | −0.38 | −1.19 | 1.16 |
| Base Coat Only | | 67.35 | 3.21 | 10.25 | 3.61 | −0.20 | −0.19 |
| Comparative B | | 63.74 | 3.01 | 10.06 | 0 | 0 | 0 |

Example 4

A color array was prepared as described in Example 1. The non-metallic base coat painted test panel was prepared as described in Comparative Example A, except that no clear coat was applied. The release liner was removed from the laminated color array. The color array was then laminated onto the non-metallic base coated paint test panel card to form a color-matching card. Any air bubbles trapped between the color array and the test panel card base coated were removed by manually squeegeeing as described above. The color-matching card had 26 color iterations for use as a tinting guide, wherein the inkjet transparency film and adhesive further simulated a clearcoat appearance. CIE 1976 L* a* b* and ΔL*, Δa*, and Δb* values are listed in Table 5.

TABLE 5

| Row | Column | L* | a* | b* | ΔL* | Δa* | Δb* |
|---|---|---|---|---|---|---|---|
| 1 | A | 71.83 | 0.12 | 3.92 | −1.70 | −0.11 | −0.40 |
| 1 | B | 72.22 | 0.03 | 3.75 | −1.31 | −0.20 | −0.57 |
| 2 | A | 72.09 | 0.08 | 3.81 | −1.44 | −0.15 | −0.51 |
| 2 | B | 71.30 | −1.25 | 2.80 | −2.23 | −1.48 | −1.52 |
| 3 | A | 70.58 | −1.02 | 3.47 | −2.95 | −1.25 | −0.85 |
| 3 | B | 69.06 | −4.33 | 3.33 | −4.47 | −4.56 | −0.99 |
| 4 | A | 70.97 | −0.87 | 3.11 | −2.56 | −1.10 | −1.21 |
| 4 | B | 70.02 | −3.11 | 1.91 | −3.51 | −3.34 | −2.41 |
| 5 | A | 70.95 | −0.90 | 3.14 | −2.58 | −1.13 | −1.18 |
| 5 | B | 69.74 | −3.00 | 1.45 | −3.79 | −3.23 | −2.87 |
| 6 | A | 70.83 | −0.88 | 3.13 | −2.70 | −1.11 | −1.19 |
| 6 | B | 68.82 | −2.10 | −0.20 | −4.71 | −2.33 | −4.52 |
| 7 | A | 70.27 | 0.36 | 3.08 | −3.26 | 0.13 | −1.24 |
| 7 | B | 68.16 | 0.08 | 0.66 | −5.37 | −0.15 | −3.66 |
| 8 | A | 70.80 | 0.90 | 3.51 | −2.73 | 0.67 | −0.81 |
| 8 | B | 68.77 | 2.07 | 2.02 | −4.76 | 1.84 | −2.30 |
| 9 | A | 70.77 | 1.28 | 3.27 | −2.76 | 1.05 | −1.05 |
| 9 | B | 69.33 | 2.57 | 2.45 | −4.20 | 2.34 | −1.87 |
| 10 | A | 70.84 | 1.08 | 3.45 | −2.69 | 0.85 | −0.87 |
| 10 | B | 69.66 | 2.03 | 3.40 | −3.87 | 1.80 | −0.92 |
| 11 | A | 70.99 | 0.36 | 4.46 | −2.54 | 0.13 | 0.14 |

TABLE 5-continued

| Row | Column | L* | a* | b* | ΔL* | Δa* | Δb* |
|---|---|---|---|---|---|---|---|
| 11 | B | 70.29 | 1.34 | 4.12 | −3.24 | 1.11 | −0.20 |
| 12 | A | 71.41 | −0.07 | 4.88 | −2.12 | −0.30 | 0.56 |
| 12 | B | 70.95 | 0.38 | 5.74 | −2.58 | 0.15 | 1.42 |
| 13 | A | 71.38 | −0.19 | 5.36 | −2.15 | −0.42 | 1.04 |
| 13 | B | 70.80 | −0.55 | 6.85 | −2.73 | −0.78 | 2.53 |
| 14 | A | 71.48 | −0.17 | 5.37 | −2.05 | −0.40 | 1.05 |
| 14 | B | 70.84 | −1.16 | 6.84 | −2.69 | −1.39 | 2.52 |
| ComparativeA | | 73.53 | 0.228 | 4.32 | 0 | 0 | 0 |

Example 5

A color array was prepared as described in Example 1. The printed side of the color array was then coated using the nonmetallic base coat paint and the same technique used to coat the test panel card described in comparative Example A. After the third spray coating of nonmetallic base coat the paint was allowed to dry for 60 minutes. CIE 1976 L* a* b* values of the resulting color-matching film were measured, through the film support, as described in Example 1. Results are listed in Table 6.

TABLE 6

| Row | Column | L* | A* | b* | ΔL* | Δa* | Δb* |
|---|---|---|---|---|---|---|---|
| 1 | A | 72.23 | 0.00 | 3.54 | −1.30 | −0.23 | −0.78 |
| 1 | B | 72.20 | −0.01 | 3.51 | −1.33 | −0.24 | −0.81 |
| 2 | A | 72.23 | 0.01 | 3.53 | −1.30 | −0.22 | −0.79 |
| 2 | B | 71.57 | −1.04 | 2.61 | −1.96 | −1.27 | −1.71 |
| 3 | A | 71.79 | −0.82 | 3.21 | −1.74 | −1.05 | −1.11 |
| 3 | B | 70.59 | −3.22 | 2.90 | −2.94 | −3.45 | −1.42 |
| 4 | A | 72.08 | −0.74 | 2.83 | −1.45 | −0.97 | −1.49 |
| 4 | B | 70.99 | −2.43 | 1.73 | −2.54 | −2.66 | −2.59 |
| 5 | A | 72.10 | −0.75 | 2.85 | −1.43 | −0.98 | −1.47 |
| 5 | B | 71.07 | −2.36 | 1.41 | −2.46 | −2.59 | −2.91 |
| 6 | A | 71.80 | −0.73 | 2.84 | −1.73 | −0.96 | −1.48 |
| 6 | B | 69.33 | −1.66 | 0.14 | −4.20 | −1.89 | −4.18 |
| 7 | A | 71.66 | 0.21 | 2.87 | −1.87 | −0.02 | −1.45 |
| 7 | B | 69.63 | 0.01 | 1.02 | −3.90 | −0.22 | −3.30 |
| 8 | A | 71.83 | 0.61 | 3.26 | −1.70 | 0.38 | −1.06 |
| 8 | B | 70.31 | 1.51 | 2.23 | −3.22 | 1.28 | −2.09 |
| 9 | A | 71.31 | 0.88 | 3.08 | −2.22 | 0.65 | −1.24 |
| 9 | B | 70.74 | 1.89 | 2.57 | −2.79 | 1.66 | −1.75 |
| 10 | A | 71.58 | 0.72 | 3.15 | −1.95 | 0.49 | −1.17 |
| 10 | B | 70.95 | 1.51 | 3.24 | −2.58 | 1.28 | −1.08 |
| 11 | A | 71.89 | 0.22 | 3.95 | −1.64 | −0.01 | −0.37 |
| 11 | B | 71.20 | 1.00 | 3.81 | −2.33 | 0.77 | −0.51 |
| 12 | A | 72.17 | −0.12 | 4.29 | −1.36 | −0.35 | −0.03 |
| 12 | B | 71.57 | 0.30 | 5.04 | −1.96 | 0.07 | 0.72 |
| 13 | A | 71.97 | −0.17 | 4.63 | −1.56 | −0.40 | 0.31 |
| 13 | B | 71.98 | −0.39 | 5.94 | −1.55 | −0.62 | 1.62 |
| 14 | A | 72.14 | −0.19 | 4.67 | −1.39 | −0.42 | 0.35 |
| 14 | B | 71.76 | −0.82 | 5.89 | −1.77 | −1.05 | 1.57 |
| Comparative A | | 73.53 | 0.228 | 4.32 | 0 | 0 | 0 |

Example 6

A color-matching article was prepared as described in Example 5, except that prior to the painting process, the color-matching article was laminated to a protective overlay sheet comprising pressure-sensitive adhesive coated paper available under the trade name "3M WELD & SPARK DEFLECTION PAPER" (available from 3M Co., St. Paul, Minn.). The protective overlay sheet was left in place during painting of the color-matching article but was removed from prior to viewing. No over-spray was observed on the viewing surface of the color-matching aide. CIE 1976 L* a* b* values of the resulting color-matching film were measured, through the film support, as described in Example 1. Results are listed in Table 7.

TABLE 7

| Row | Column | L* | a* | b* | ΔL* | Δa* | Δb* |
|---|---|---|---|---|---|---|---|
| 1 | A | 71.91 | −0.38 | 4.71 | −1.62 | −0.61 | 0.39 |
| 1 | B | 72.16 | −0.36 | 4.64 | −1.37 | −0.59 | 0.32 |
| 2 | A | 71.91 | −0.37 | 4.69 | −1.62 | −0.60 | 0.37 |
| 2 | B | 71.16 | −1.41 | 3.80 | −2.37 | −1.64 | −0.52 |
| 3 | A | 71.49 | −1.30 | 4.53 | −2.04 | −1.53 | 0.21 |
| 3 | B | 69.98 | −4.11 | 5.00 | −3.55 | −4.34 | 0.68 |
| 4 | A | 71.44 | −1.18 | 4.05 | −2.09 | −1.41 | −0.27 |
| 4 | B | 70.35 | −2.94 | 3.18 | −3.18 | −3.17 | −1.14 |
| 5 | A | 71.37 | −1.17 | 4.03 | −2.16 | −1.40 | −0.29 |
| 5 | B | 70.60 | −2.92 | 2.68 | −2.93 | −3.15 | −1.64 |
| 6 | A | 71.19 | −1.17 | 4.11 | −2.34 | −1.40 | −0.21 |
| 6 | B | 69.69 | −1.65 | 1.06 | −3.84 | −1.88 | −3.26 |
| 7 | A | 70.87 | 0.11 | 3.96 | −2.66 | −0.12 | −0.36 |
| 7 | B | 69.63 | 0.01 | 1.02 | −3.90 | −0.22 | −3.30 |
| 8 | A | 70.92 | 0.48 | 4.22 | −2.61 | 0.25 | −0.10 |
| 8 | B | 69.83 | 2.15 | 2.84 | −3.70 | 1.92 | −1.48 |
| 9 | A | 71.03 | 0.92 | 3.99 | −2.50 | 0.69 | −0.33 |
| 9 | B | 69.90 | 2.54 | 3.10 | −3.63 | 2.31 | −1.22 |
| 10 | A | 70.81 | 0.71 | 4.16 | −2.72 | 0.48 | −0.16 |
| 10 | B | 70.02 | 1.92 | 4.11 | −3.51 | 1.69 | −0.21 |
| 11 | A | 71.21 | −0.11 | 5.29 | −2.32 | −0.34 | 0.97 |
| 11 | B | 70.59 | 1.15 | 5.02 | −2.94 | 0.92 | 0.70 |
| 12 | A | 71.69 | −0.62 | 5.83 | −1.84 | −0.85 | 1.51 |
| 12 | B | 70.94 | −0.04 | 6.79 | −2.59 | −0.27 | 2.47 |
| 13 | A | 71.64 | −0.76 | 6.26 | −1.89 | −0.99 | 1.94 |
| 13 | B | 71.58 | −1.13 | 8.16 | −1.95 | −1.36 | 3.84 |
| 14 | A | 71.48 | −0.77 | 6.41 | −2.05 | −1.00 | 2.09 |
| 14 | B | 71.26 | −1.69 | 8.33 | −2.27 | −1.92 | 4.01 |
| Comparative A | | 73.53 | 0.228 | 4.32 | 0 | 0 | 0 |

What is claimed is:

1. A color-matching article comprising:
   (a) a color-matching film comprising:
      a transparent base film having a first major surface and a second major surface; and
      a colored layer adhered to at least one major surface of the base film, the colored layer including a plurality of transparent colored regions; and
   (b) an index that associates at least one of the colored regions with at least one mixing base color.

2. The color-matching article of claim 1, wherein the colored layer is adhered to the second major surface of the base film and further including an adhesive layer applied over the colored layer.

3. The color-matching article of claim 2, wherein the adhesive layer comprises a pressure-sensitive adhesive.

4. The color-matching article of claim 3, further including a low-adhesion backsize layer adhered to the first major surface of the base film.

5. The color-matching article of claim 1, wherein the colored layer is adhered to the first major surface of the base film and wherein the color-matching article further includes a transparent top layer adhered to the colored layer.

6. The color-matching article of claim 5, further including an adhesive layer adhered to the second major surface of the base film.

7. The color-matching article of claim 1, wherein the color-matching article includes at least one uncolored region.

8. The color-matching article of claim 1, wherein the colored layer comprises from 2 to 100 colored regions.

9. The color-matching article of claim 1, wherein the colored layer comprises from 10 to 30 colored regions.

10. The color-matching article of claim 1, wherein each of the colored regions is a different color.

11. The color-matching article of claim 1, wherein at least two of the colored regions have a $\Delta E_{ab}^*$ of 0.2 or greater.

12. The color-matching article of claim 1, wherein any two of the colored regions have a $\Delta E_{ab}$ of 0.2 or greater.

13. The color-matching article of claim 1, wherein adjacent colored regions have a $\Delta E_{ab}^*$ of about 0.2 or greater.

14. The color-matching article of claim 1, wherein the transparent base film layer is selected from the group consisting of polyester, polycarbonate, acrylic, polyurethane, polyolefin, ethylene vinyl acetate, biaxially oriented polypropylene, polyvinyl chloride, polystyrene, urethane acrylate, epoxy, epoxy acrylate, and blends thereof.

15. The color-matching article of claim 1, wherein each of the plurality of colored regions are separated from an adjacent colored region by a line of demarcation.

16. The color-matching article of claim 1, further including a protective overlay sheet releasably attached to the transparent base film.

17. The color-matching article of claim 1, wherein the index comprises a listing of at least one mixing base color printed inside or proximate each colored region.

18. The color-matching article of claim 1, wherein the index comprises:
  (a) a unique symbol identifying each of the plurality of colored regions; and
  (b) a document listing at least one mixing base color for each symbol.

19. The color-matching article of claim 1, wherein the index comprises a pictorial representation of the colored regions of the color-matching article.

20. A kit for color-matching a paint formulation to a target substrate comprising:
  (i) a color-matching article comprising:
    (a) a color-matching film comprising:
      a transparent base film having a first major surface and a second major surface; and
      a colored layer adhered to at least one major surface of the base film, the colored layer including a plurality of transparent colored regions; and
    (b) an index that associates at least one of the colored regions with at least one mixing base color;
  (ii) a layer of pressure sensitive adhesive; and
  (iii) a spray-out card.

21. The kit for color-matching of claim 20, wherein the pressure sensitive adhesive layer is applied over at least a portion of the colored layer.

22. The kit for color-matching of claim 20, wherein the color-matching film is provided in the form of a roll.

23. The kit for color-matching of claim 20, further including a laminator.

24. A color-matching article comprising:
  (a) a color-matching film comprising:
    a transparent base film having a first major surface and a second major surface; and
    a colored layer adhered to at least one major surface of the base film, the colored layer including 2 to 100 transparent colored regions; and at least one transparent uncolored region;
    a pressure sensitive adhesive layer applied over the colored layer; and
  (b) an index that associates at least one of the transparent colored regions with at least one mixing base color.

* * * * *

UNITED STATES PATENT AND TRADEMARK OFFICE
CERTIFICATE OF CORRECTION

| | |
|---|---|
| PATENT NO. | : 6,982,108 B2 |
| APPLICATION NO. | : 10/263119 |
| DATED | : January 3, 2006 |
| INVENTOR(S) | : Janssen, Jeffrey R. |

It is certified that error appears in the above-identified patent and that said Letters Patent is hereby corrected as shown below:

Column 5,
Line 1, delete "comprise" and insert -- comprises --.
Line 22, delete "1a-b" and insert -- 1a-1b --.
Line 43, after "to" delete "a".

Column 6,
Lines 32-50, after "below" delete "Referring now to FIG. 3a,------the colored layer 34." and insert -- same as a new paragraph on line 33 --.
Line 39, delete "comprise" and insert -- comprises --.

Column 8,
Line 64, delete "1a-b" and insert -- 1a-1b --.

Column 9,
Line 19, delete "120h" and insert -- 102h --.

Column 10,
Line 27, delete "inkjet," and insert -- ink-jet --.

Column 14,
Line 2, delete "Komwesthiem" and insert -- Kornwesthiem --.

Column 15,
Line 20, after "12 A" delete "2SS" and insert -- 255 --.
Line 20, before "249" delete "2S2" and insert -- 252 --.
Line 23, after "13 B" delete "2SS" and insert -- 255 --.

UNITED STATES PATENT AND TRADEMARK OFFICE
CERTIFICATE OF CORRECTION

PATENT NO. : 6,982,108 B2
APPLICATION NO. : 10/263119
DATED : January 3, 2006
INVENTOR(S) : Janssen, Jeffrey R.

It is certified that error appears in the above-identified patent and that said Letters Patent is hereby corrected as shown below:

Column 21,
Line 8, delete "$\Delta E_{ab} of$" and insert -- $\Delta E_{ab}\ `of$ --.

Signed and Sealed this

Twentieth Day of June, 2006

JON W. DUDAS
*Director of the United States Patent and Trademark Office*